(12) United States Patent
Kuroshima et al.

(10) Patent No.: US 7,122,980 B2
(45) Date of Patent: Oct. 17, 2006

(54) MOTOR DRIVING APPARATUS AND MOTOR DRIVING METHOD

(75) Inventors: Shinichi Kuroshima, Ibaraki (JP); Yoshiaki Igarashi, Ikoma (JP); Hideaki Mori, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/242,386

(22) Filed: Oct. 3, 2005

(65) Prior Publication Data

US 2006/0076911 A1  Apr. 13, 2006

(30) Foreign Application Priority Data

Oct. 4, 2004 (JP) .......................... P2004-291181

(51) Int. Cl.
*H02P 6/18* (2006.01)
(52) U.S. Cl. .................. 318/254; 318/439; 318/721
(58) Field of Classification Search ............... 318/138, 318/254, 439, 720–724
See application file for complete search history.

(56) References Cited

U.S. PATENT DOCUMENTS

| 3,739,196 | A | * | 6/1973 | Tavis | 327/334 |
| 3,906,641 | A | * | 9/1975 | Freeman | 33/363 R |
| 4,876,491 | A | | 10/1989 | Squires et al. | |
| 5,012,166 | A | * | 4/1991 | Ushijima et al. | 318/254 |
| 5,057,753 | A | * | 10/1991 | Leuthold et al. | 318/254 |
| 5,177,416 | A | * | 1/1993 | Inaji et al. | 318/254 |
| 5,254,914 | A | * | 10/1993 | Dunfield et al. | 318/254 |
| 5,530,326 | A | * | 6/1996 | Galvin et al. | 318/254 |
| 5,598,071 | A | * | 1/1997 | Dunfield et al. | 318/254 |
| 5,841,252 | A | * | 11/1998 | Dunfield | 318/254 |
| 6,483,270 | B1 | * | 11/2002 | Miyazaki et al. | 318/700 |
| 6,664,749 | B1 | * | 12/2003 | Heydt et al. | 318/254 |
| 6,686,714 | B1 | * | 2/2004 | Trifilo | 318/439 |
| 2001/0050542 | A1 | | 12/2001 | Seki et al. | |

FOREIGN PATENT DOCUMENTS

| EP | 0 251 785 | 1/1988 |
| JP | 2547778 | 3/1988 |
| JP | 2001-275387 | 10/2001 |

\* cited by examiner

*Primary Examiner*—Bentsu Ro
(74) *Attorney, Agent, or Firm*—RatnerPrestia

(57) ABSTRACT

A motor driving apparatus includes a comparator, a threshold controller, a position determining unit, a phase-switching controller, and a current output unit. While the rotor is stopped, the phase-switching controller supplies a predetermined phase of winding with a current pulse having a predetermined pulse width so as not to cause the rotor to react and operate, in order to determine the initial position of the rotor. The position determining unit determines an initial position of the rotor based on the result of comparison between the induced voltage generated in a non-conduction phase by the current pulse and the threshold. The phase-switching controller performs energization or commutation according to the determined initial position of the rotor to start up the motor.

18 Claims, 21 Drawing Sheets

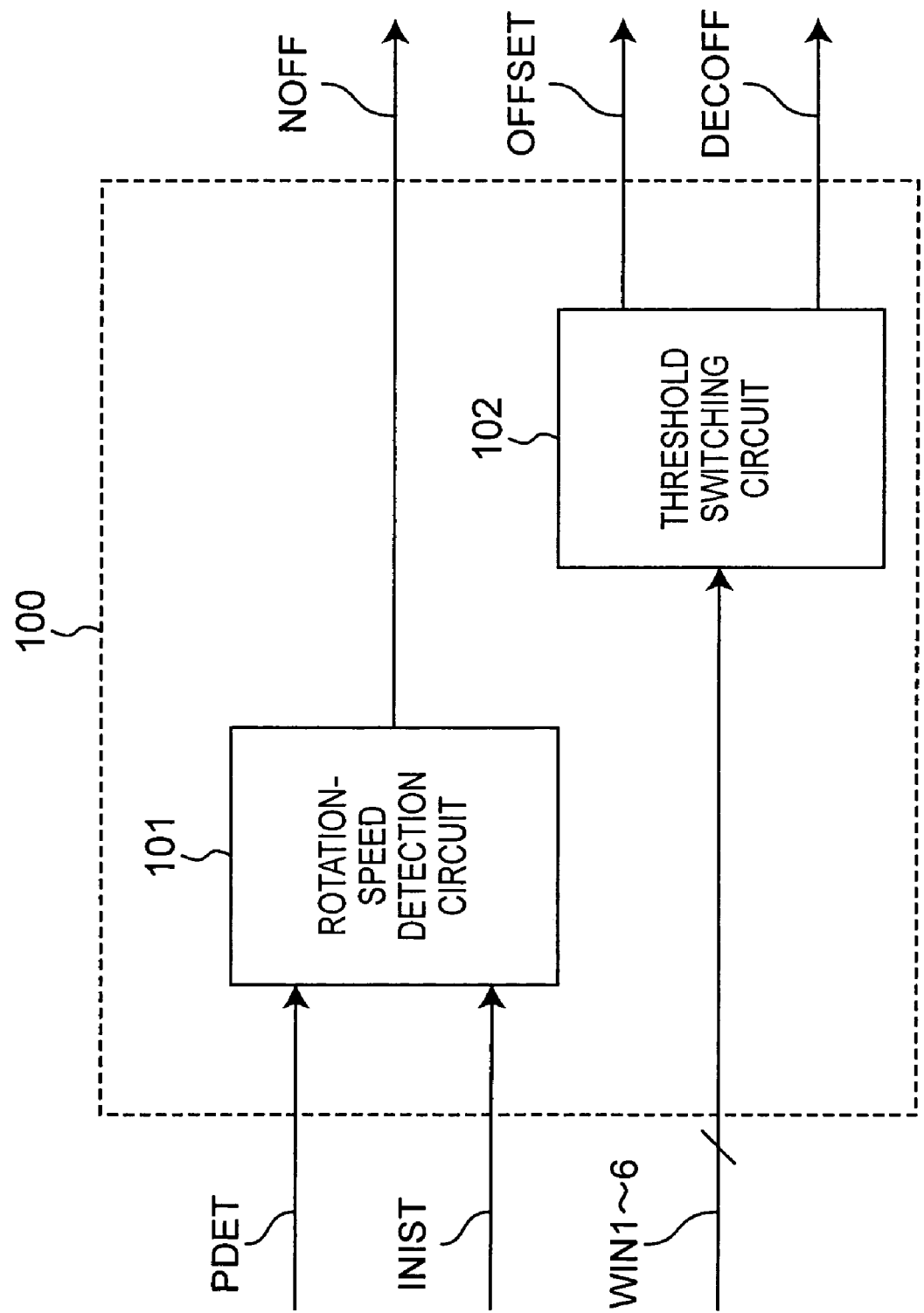

Fig.7

| SIGNAL TO BE "HIGH" | WIN1 | WIN2 | WIN3 | WIN4 | WIN5 | WIN6 |
|---|---|---|---|---|---|---|
| SELECTED SIGNAL | WM | VM | UM | VM | VM | UM |
| SPECIFIED LEVEL (DETERMINING LEVEL) | L | H | L | H | L | H |

Fig.10

| DIRECTION OF CURRENT PULSES | (1) | (2) | (3) | (4) |
|---|---|---|---|---|
| | U→V | | V→U | |
| DETECTED PHASE OF INDUCED VOLTAGE | W | | | |
| POLARITY OF THRESHOLD | POSITIVE | NEGATIVE | POSITIVE | NEGATIVE |
| CONDUCTION PHASE AT START-UP | V⇒W | U⇒W | W⇒U | W⇒V |

MOTOR DRIVING APPARATUS AND MOTOR DRIVING METHOD

BACKGROUND OF THE INVENTION

1. Field of the Invention

The present invention relates to a motor driving technique, and more particularly to a driving apparatus and a method that drive a motor in a position sensor-less system to detect a rotor position based on a zero-cross point of a back electromotive force generated in a non-conduction phase of windings.

2. Related Art

In recent years, a brush-less motor has been generally used as a spindle motor for a hard disk, an optical disk and the like, or as a fan motor and a compressor-driving motor for an air conditioner. In general, the brush-less motor is driven in PWM control by an inverter so as to provide a variable speed controlling operation in a wide range and also to achieve low power consumption.

Inside the brush-less motor having three-phase windings, in general, position sensors such as hole elements are placed at every electrical angle of 120 degrees so as to detect the position of a magnetic pole of a rotor. Here, in order to reduce costs and achieve a small-size device, various sensor-less techniques have been developed. With respect to a means for achieving a sensor-less driving operation, there is a method including the steps of carrying out 120 degree conduction, and detecting the rotor position by detecting a zero-cross point of a back electromotive force generated during a non-conduction period. In this method, however, since no back electromotive force is generated unless the motor is rotating, the back electromotive force is not detected at the time of starting the motor, with the result that a starting failure, such as oscillation, loss of synchronism and reverse rotation, tends to occur depending on the initial position of the rotor.

For this reason, a means for determining a relative position of the rotor to the stator in a motor stop state has been proposed.

For example, Japanese Patent No. 2547778 has proposed a controlling system in which a voltage is applied across each terminal of stator windings for such a short period of time as not to allow the rotor to react to move so that the winding that generates an electric current having the highest amplitude value is determined as a winding to be used for starting a current supply.

Moreover, for example, JP2001-275387A has proposed a controlling system in which a current pulse, which is such a short pulse as not to allow the rotor to react to move, is allowed to successively flow each terminal with its polarity being changed, so that an induced voltage generated in a non-conduction phase at this time, is detected and added to determine the initial position of the rotor. FIG. 19 is a drawing that shows a structure used for achieving the controlling system indicated by JP2001-275387A. FIG. 20A is a drawing that shows the results of measurements of the induced voltage generated by the current pulse generated in the non-conduction phase.

In FIG. 19, a motor 10 includes a rotor (not shown) having a magnetic-field section given by a permanent magnet and a stator in which a U-phase winding 11, a V-phase winding 12 and a W-phase winding 13 are Y-connected. A current output unit 20 is composed of, for example, 3-phase bridge circuits and is placed between a power supply and a GND so that a voltage is applied to the terminal of each winding to flow a current. A phase-switching controller 50 determines a winding through which a current pulse flows, and outputs a signal for providing a current pulse flow to the current output unit 20 and a signal for indicating a selected winding to an induced voltage detection unit 110, respectively.

In response to the signal of the phase-switching controller 50, the induced voltage detection unit 110 detects induced voltages of respective phases from three-phase terminal voltages Vu, Vv and Vw as well as a neutral-point voltage Vc of the motor 10, and outputs values of the induced voltages to an adder 120. The adder 120 adds an induced voltage of a non-conduction phase obtained when current pulses forwardly flows through a phase winding to an induced voltage thereof obtained when current pulses reversely flows through the phase winding.

For example, in FIG. 20A, a solid line 111 indicates an induced voltage generated in the W-phase winding 13 upon supplying current pulses from the U-phase winding 11 to the V-phase winding 12, and a broken line 112 indicates an induced voltage generated in the W-phase winding upon supplying current pulses from the V-phase winding 12 to the U-phase winding 11 in a reversed manner. The ordinate axis represents a detection voltage (mV), and the abscissa axis indicates a relative position of the rotor to the stator with an electrical angle (degrees). The adder 120 adds the induced voltage 111 and the induced voltage 112 detected by the induced voltage detection unit 110 and shown in FIG. 20A to obtain a sum of induced voltages 113 shown in FIG. 20(b).

A polarity determining unit 130 determines the polarity of the sum 113 of induced voltages obtained in the adder 120. When it is determined to be the sum of induced voltages of U-phase, the unit 130 outputs the resulting signal to a UDATA storage device 141. When it is determined to be the sum of induced voltages of V-phase, the unit 130 outputs the resulting signal to a VDATA storage device 142. When it is determined to be the sum of induced voltages of W-phase, the unit 130 outputs the resulting signal to a WDATA storage device 143. In FIG. 20B, since the sum of induced voltages of W-phase is shown, the determined polarity is output to the WDATA storage device 143. Moreover, with respect to the U-phase and V-phase, the sum of induced voltages is obtained in the same manner, and the determined polarity is output to the UDATA storage device 141 and the VDATA storage device 142, respectively. Each of the UDATA storage device 141, the VDATA storage device 142 and the WDATA storage device 143 stores the polarity of the sum of induced voltages output from the polarity determining unit 130.

A judgment unit 150 judges the initial position of the rotor based on combinations of polarities respectively stored in the UDATA storage device 141, the VDATA storage device 142 and the WDATA storage device 143.

A timing generator 160 outputs timing signals to the phase-switching controller 50, the induced voltage detection unit 110, the adder 120, the UDATA storage device 141, the VDATA storage device 142, the WDATA storage device 143 and the judgment unit 150 so as to control timings of the respective processes.

In the control system proposed in Japanese Patent No. 2547778, since the highest amplitude value is varied dependent on production deviations among the windings of the stator, a detection error tends to occur due to slight deviations in the windings. Consequently, a starting failure, such as oscillation, loss of synchronism and reverse rotation, tends to occur.

Moreover, in the control system proposed in JP2001-275387A, an adder 120, which holds induced voltages and adds these, is installed, and an externally added capacity and circuits for charging and discharging the capacity are required as constituent components. Moreover, since the rotor initial position is judged based on combinations of polarities of the sum of induced voltages of the respective phase windings, it is necessary to refer to a table or the like relating to the combinations, which makes the structure of the device more complicated. Moreover, since an induced voltage is detected by using a pair of current pulses in a forward direction and a reverse direction, and since the induced voltage is detected for each of the phase windings, current pulses of six patterns in total need to be always supplied. For this reason, upon judging the initial position of the rotor, a period of time (one cycle) required for supplying the current pulses of six patterns is inevitably required.

SUMMARY OF THE INVENTION

The present invention has been devised to solve the above-mentioned problems, and has its objective to provide a driving apparatus and a method which can achieve stable sensor-less starting without a starting failure, that is, which can shorten a period of time required for judging the relative initial position of the rotor to the stator and achieve a simple structure of the apparatus.

A motor driving apparatus according to the present invention is an apparatus which drives a motor having windings of a plurality of phases and a rotor in a sensor-less control. The motor driving apparatus includes a comparator operable to compare an induced voltage generated in a motor winding of a non-conduction phase with a predetermined threshold, a threshold controller operable to control the threshold; a position determining unit operable to determine a rotor position based on an output from the comparator, a phase-switching controller operable to switch a conduction phase in response to the rotor position; and a current output unit operable to generate a current used for driving the motor and to supply the current to the conduction phase. While the rotor is stopped, the phase-switching controller supplies a predetermined phase of winding with a current pulse having a predetermined pulse width so as not to cause the rotor to react and operate in order to determine the initial position of the rotor. The position determining unit determines an initial position of the rotor based on the result of comparison between the induced voltage generated in a non-conduction phase by the current pulse and the threshold. The phase-switching controller performs energization (or commutation) according to the determined initial position of the rotor to start up the motor.

This arrangement allows the initial position of the rotor to be determined quickly, consequently providing a stable starting operation. It also make it possible to start supplying a current to an appropriate phase at an earlier timing at start up, consequently reducing a period required for achieving a desired rotation speed.

In accordance with the present invention, the rotor initial position can be detected in a short time, and a stable sensor-less starting operation is carried out without a starting failure; thus, it becomes possible to shorten a period of time required for starting by using a simple structure.

BRIEF DESCRIPTION OF THE DRAWINGS

FIG. 4A is a drawing that shows a specific structure of a threshold controller.

FIG. 7 is a drawing that shows signals to be used upon determination of the initial position and determining levels, which are specified by a polarity determining circuit.

FIG. 10 is a drawing that shows a relationship between a conduction direction of a current pulse obtained in FIG. 9 and a conduction direction upon starting.

DESCRIPTION OF THE PREFERRED EMBODIMENTS

Referring to accompanied drawings, preferred embodiments of a motor driving apparatus and a method of the present invention are described below.

According to a motor driving apparatus explained below, an induced voltage of one phase of windings of a motor is detected, and its amplitude value (absolute value) is compared with a threshold so that the initial position of a rotor is determined. Thus, an energization is started from a phase that corresponds to an initial position to start up the motor. The details thereof are described below.

Embodiment 1

Figure 1:
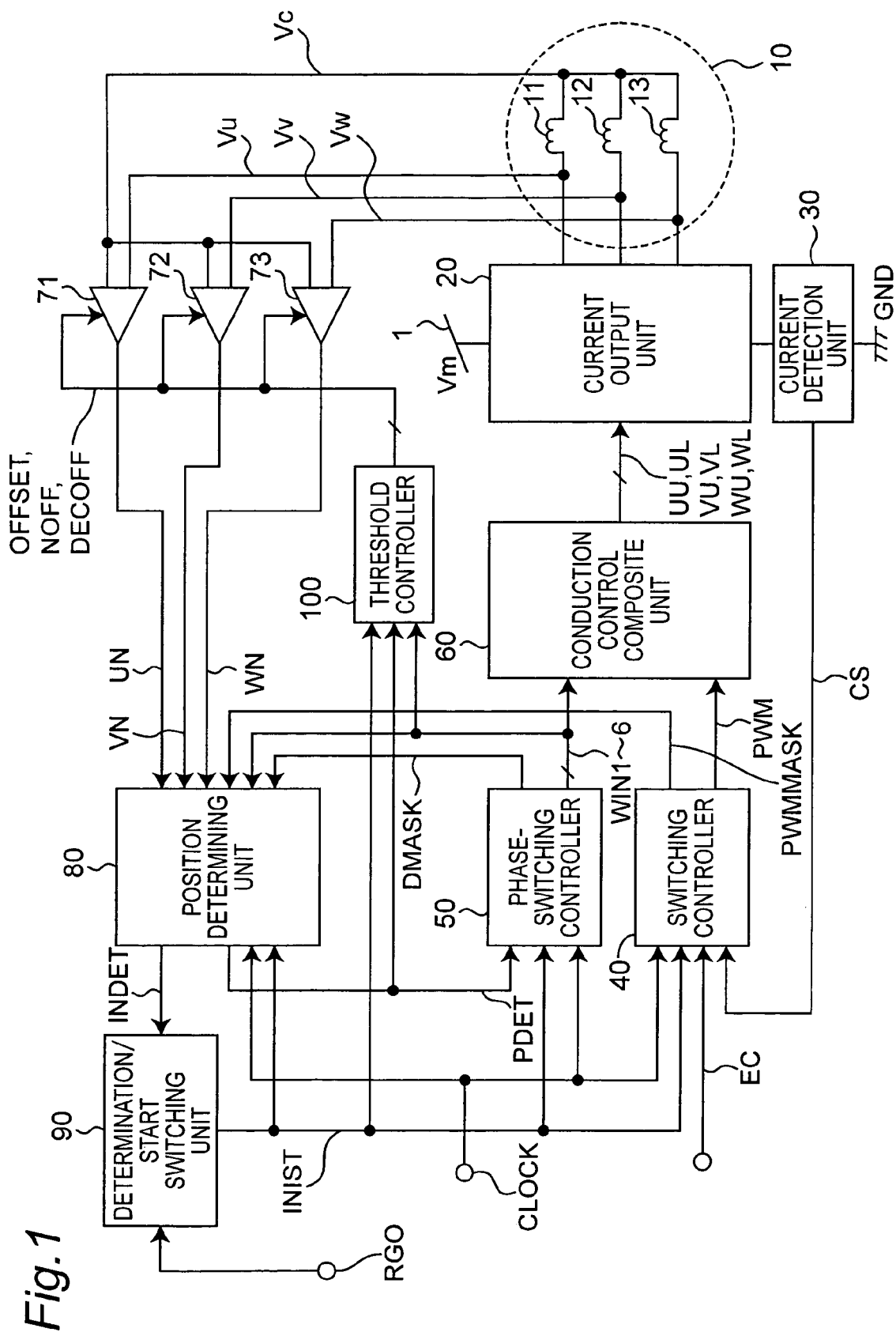
FIG. 1 is a drawing that shows a structure of a sensor-less motor driving apparatus in accordance with Embodiment 1 of the present invention.

FIG. 1 shows a structure of a sensor-less motor driving apparatus in accordance with Embodiment 1 of the present invention. A motor 10 to be controlled by the motor driving apparatus of the present embodiment includes a rotor having a magnetic field section formed by a permanent magnet and a stator having Y-connection of a U-phase winding 11, a V-phase winding 12 and a W-phase winding 13.

The sensor-less motor driving apparatus is provided with a current output unit 20, a current detection unit 30, a switching controller 40, a phase-switching controller 50, a conduction control composite unit 60, comparators 71, 72 and 73, a position determining unit 80, a determination/start switching unit 90 and a threshold controller 100.

Signals to be transmitted and received in the motor driving apparatus of the present embodiment are described below.

CLOCK: A clock signal (duty ratio=50% in the present embodiment).

DMASK: A mask signal for masking a ringing period of a non-conduction phase (a phase not to be energized) due to a voltage change in a conduction phase (a phase to be energized) and a period in which all the three phases are maintained at high impedance.

INDET: An Initial-position determining signal. A pulse is output when the determination of the rotor position has been successfully made.

INIST: A state-switching signal. A signal used for switching the operation state to either of an initial position determining operation and an acceleration operation (motor driving operation).

PDET: A phase-switching signal. This signal provides switching timing of a conduction phase.

PWM: A signal for providing a duty ratio in the PWM driving operation.

PWMMASK: A mask signal for masking influences from high-frequency switching noise caused by the PWM driving operation.

RGO: external instruction for instructing a starting/stopping operation.

UN, VN, WN: Comparison output signals. Each signal indicates comparison result of terminal voltage of each phase of the motor and the neutral point voltage thereof using threshold.

UU, UL, VU, VL, WU, WL: Signals for driving the switching elements of the current output unit, respectively.

Figure 11:
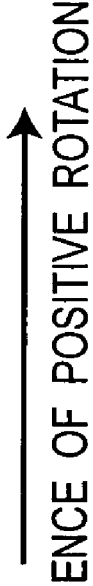
FIG. 11 is a drawing that shows relationships among a direction of current pulses (combination between a conduction phase and a conduction direction) upon determination of the initial position, a phase of a winding from which an induced voltage is detected, a polarity of a threshold used for determining the position and a conduction phase upon starting after the completion of the initial position determination.

WIN1 to 6: Signals for determining patterns to be used out of six conduction patterns in an initial position determining operation or an accelerating operation. In this case, the motor driving apparatus has six conduction patterns which correspond to combinations of conduction phases as shown in FIG. 11. Energization with these six conduction patterns while switching these patterns in a predetermined order causes the motor to be driven to rotate forwardly (accelerate). Moreover, in the initial position determining operation, the motor driving apparatus performs energization (or commutation) with the six kinds of conduction patterns while switching the patterns in the same order as that of the accelerating operation in order to determine the initial position.

Returning to FIG. 1, the current output unit 20 includes bridge circuits of three phases with each phase being provided with two switching elements that are series-connected. The current output unit 20 is placed between a power supply 1 (Vm) and a GND, and applies a voltage across each of terminals of the windings to flow a driving current. These driving currents are controlled by the output signals UU, UL, VU, VL, WU and WL from the conduction control composite unit 60.

The current detection unit 30 which is placed between the current output unit 20 and the GND, is designed to detect a current flowing from the power supply 1 to the GND, and the current detection signal CS thus detected is output to the switching controller 40.

The determination/start switching unit 90 receives the external starting/stopping instruction signal RGO, and generates and outputs a signal (INIST) for switching operations between the accelerating operation and the initial-position detecting operation. The INIST signal is set to "L (Low)" level during the initial-position detecting operation, and is also set to "H (High)" level during the accelerating operation.

The switching controller 40 outputs a PWM signal for carrying out peak-value-controlling operations of currents in response to the current detection signal CS from the current detection unit 30 and the external instruction signal EC, to the conduction control composite unit 60. Moreover, the switching controller 40 outputs the PWMMASK signal for masking influences from high-frequency switching noise generated by the PWM driving operation, to the position determining unit 80. Here, when the state-switching signal (INIST signal) from the determination/start switching unit 90 is at "L" level, the switching controller 40 is not operated and the PWM signal and the PWMMASK signal are set to "H" level, with the result that the PWM driving operation is not carried out.

The phase-switching controller 50 controls conduction phase of windings. The phase-switching controller 50 switches the conduction phase in response to the PDET signal from the position determining unit 80 to output, to the conduction control composite unit 60 and the position determining unit 80, the signals WIN1, WIN2, WIN3, WIN4, WIN5 and WIN6, each having information of the conduction phase. The signals WIN1 to 6 correspond to six patterns that are driving patterns for switching elements contained in the current output unit 20, respectively. The outputs of the signals WIN1 to 6 are switched in response to the INIST signal from the determination/start switching unit 90. Moreover, the mask signal DMASK is output to the position determining unit 80 so as to mask the ringing period of the non-conduction phase due to a voltage change in the conduction phase and the period in which all the three phases are maintained at high impedance.

Figure 2:
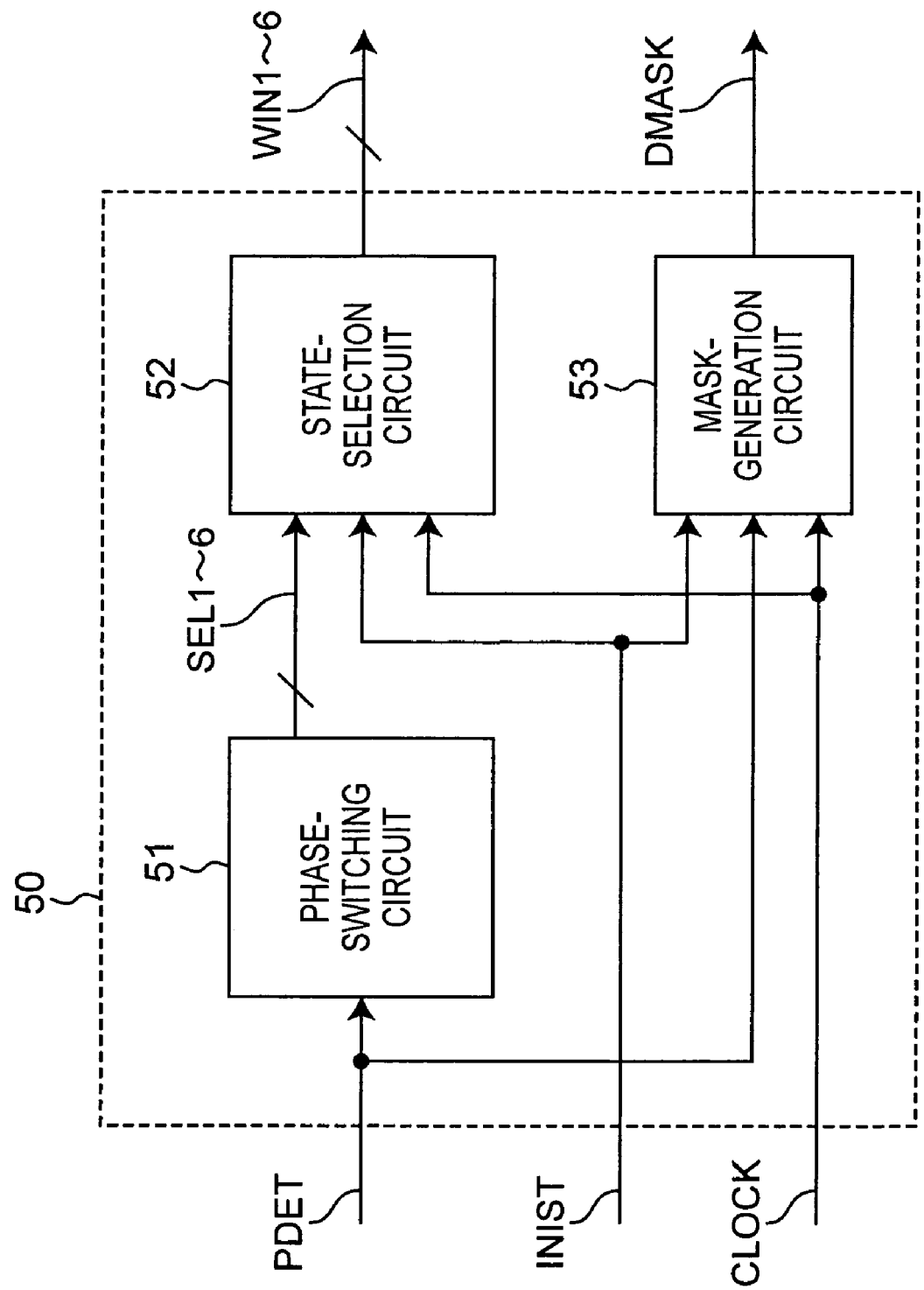
FIG. 2 is a drawing that shows a specific structure of a phase-switching controller.
Figure 3:
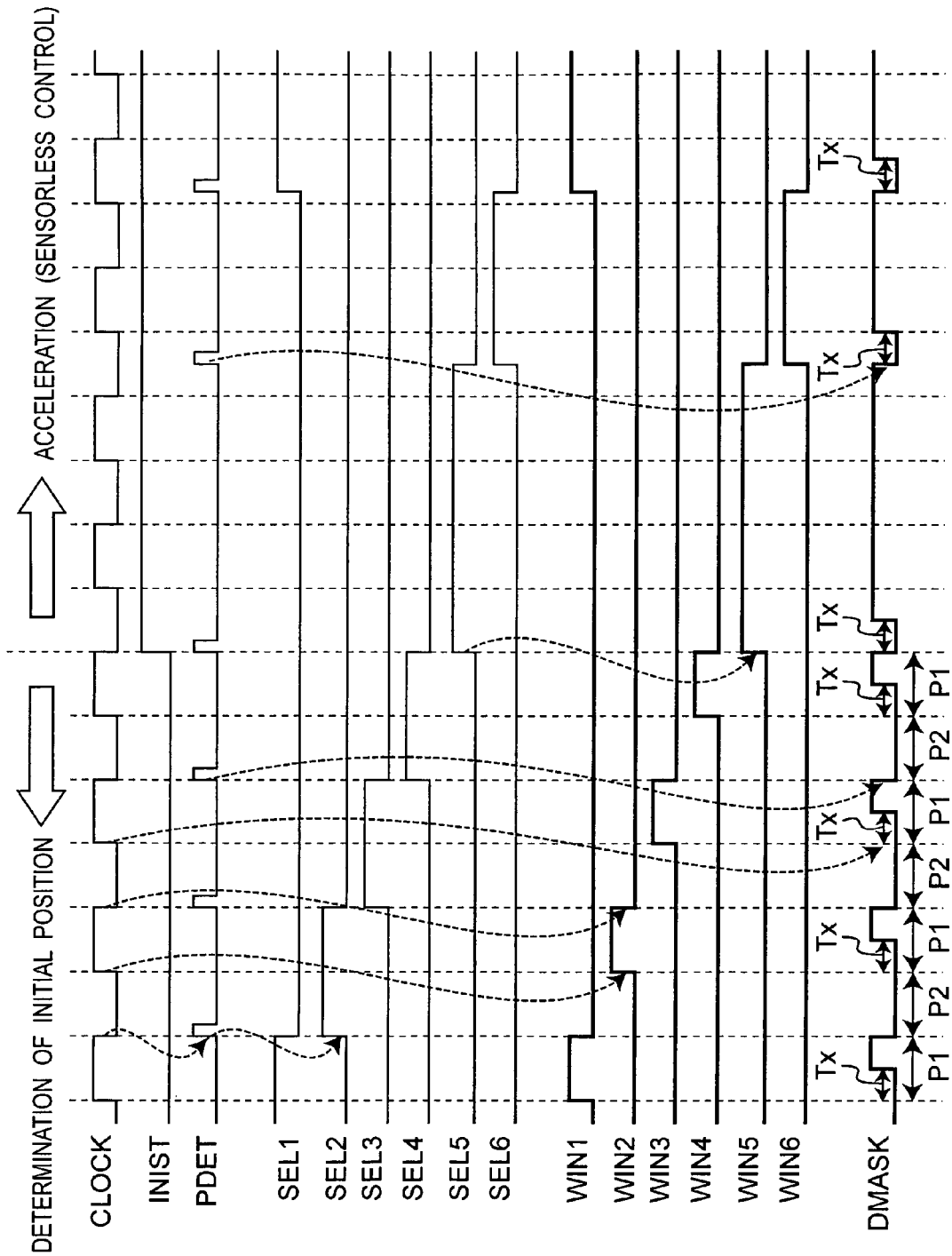
FIG. 3 is a signal waveform diagram that explains the operation of the phase-switching controller.

FIG. 2 is a drawing that explains a specific structure of the phase-switching controller 50, and FIG. 3 is a drawing that explains the operation of the phase-switching controller 50.

As shown in FIG. 2, the phase-switching controller 50 includes a phase-switching circuit 51, a state-selection circuit 52 and a mask-generation circuit 53. The phase-switching circuit 51 sets the signals SEL1 to 6 to "H" level sequentially at the rising timing of the phase-switching signal (PDET) that is synchronous to a constant cycle signal (CLOCK) of an external input from the position determining unit 80. In response to the INIST signal from the determination/start switching unit 90, the state selection circuit 52 switches between an operation to output the input signals SELL to 6 as signals WIN1 to 6, and an operation to output only the latter half of the "H" level part of the signals SEL1 to 6 as signals WIN1 to 6 at the rising timing of the CLOCK signal. In this manner, generation of the signals WIN1 to 6 from only the latter half of the "H" level part of the signals SEL1 to 6 can provide alternate appearance of a conduction period (P1) and a period (P2) in which all the phases are maintained at high impedance when the initial position is being determined, as shown in FIG. 3. This arrangement is made so as to prevent the motor current generated in the previous conduction phase (current-supplying pattern) from providing adverse effects to the position determining operation in the next conduction phase.

The mask-generation circuit 53 outputs the mask signal DMASK in response to the CLOCK signal, the PDET signal and the INIST signal. During a period of "L" level of the DMASK signal, the output signals UN, VN and WN from the comparators 71, 72 and 73 are masked in the position determining unit 80. The mask signal DMASK rises from "L" level to "H" level with a delay of predetermined time Tx from the rising timing of the CLOCK signal, when the INIST signal is at "L" level (that is, in an operation of determining the initial position), while it falls from "H" level to "L" level at the rising timing of the PDET signal. In contrast, when the INIST signal is at "H" level (that is, in an accelerating operation), the DMASK signal falls at the rising timing of the PDET signal, while it rises with a delay of the predetermined time Tx from the rising timing of the PDET signal.

The conduction control composite unit 60 receives the PWM signal from the switching controller 40 and the output signals WIN1 to 6 from the phase-switching controller 50, and composes these signals to output the signals UU, UL, VU, VL, WU and WL to the current output unit 20 so that energization state of the windings of the respective phases including the PWM driving operation are determined.

The comparators 71, 72 and 73 compare the terminal voltages Vu, Vv and Vw of the respective phases with the neutral-point voltage Vc of the motor 10, and output comparison output signals UN, VN and WN to the position determining unit 80. Each of the comparators 71, 72 and 73 has a threshold that serves as an offset voltage. Upon receipt of a NOFF signal from the threshold controller 100, each comparator 71, 72 or 73 sets the threshold to zero or a predetermined finite value. When the threshold is a finite value, the comparator 71, 72 or 73 switches the polarity of the threshold in accordance with an OFFSET signal from the threshold controller 100, and changes the absolute value of the threshold in accordance with the DECOFF signal from the threshold controller 100.

The threshold controller 100 receives the signals WIN1 to 6 from the phase-switching controller 50 to output the OFFSET signal and the DECOFF signal to the comparators 71, 72 and 73. Moreover, the threshold controller 100 receives the INIST signal from the determination/start switching unit 90 and the PDET signal from the position determining unit 80 to output the NOFF signal to the comparators 71, 72 and 73.

Figure 4B:
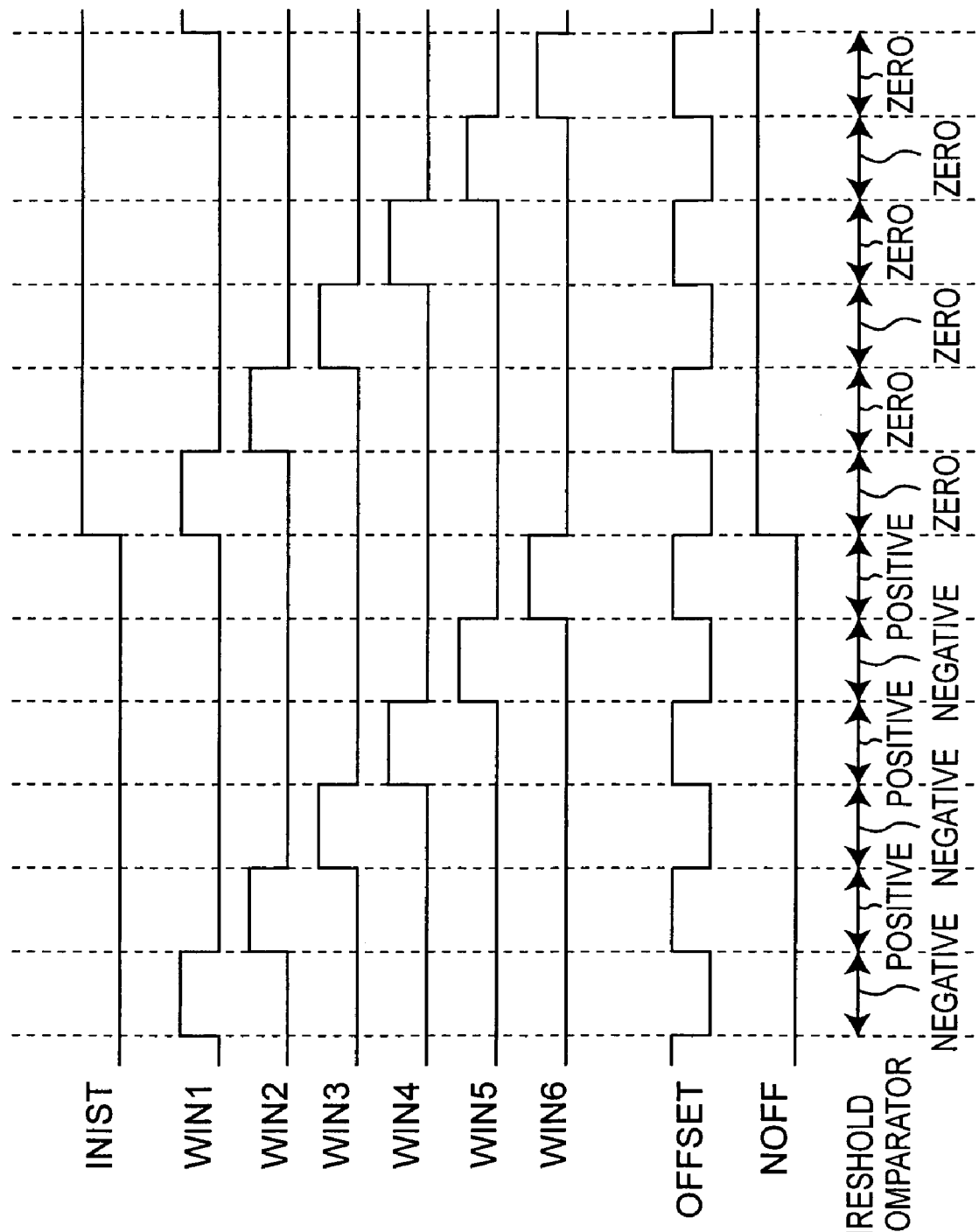
FIG. 4B is a signal waveform diagram that explains the operation of the threshold controller.

FIG. 4A shows a specific structure of the threshold controller 100, and FIG. 4B explains the operation of the threshold controller 100.

As shown in FIG. 4A, the threshold controller 100 includes a rotation-speed detection circuit 101 and a threshold switching circuit 102.

When the INIST signal is at "L" level (that is, in the initial-position detecting operation), the rotation-speed detection circuit 101 sets the NOFF signal to "L" level independent of the rising cycle of the PDET signal. Moreover, the threshold switching circuit 102 switches the OFFSET signal depending on a signal at "H" level among the signals WIN1 to 6. Here, when the signals WIN1, WIN3 and WIN5 output "H" level, the OFFSET signal outputs "L" level so that the threshold of each comparator 71, 72 or 73 has a negative polarity. When the signals WIN2, WIN4 and WIN6 output "H" level, the OFFSET signal outputs "H" level so that the threshold of each comparator 71, 72 or 73 has a positive polarity. When all the signals WIN1 to 6 are at "L" level, the previous state is maintained.

When the INIST signal is at "H" level (that is, in the accelerating operation), the rotation-speed detection circuit 101 detects a rotor rotation speed from a cycle of rising of the PDET signal. When the rotation speed exceeds a set value, the rotation-speed detection circuit 101 outputs the NOFF signal at "H" level. Here, the set value of the rotation speed may be a predetermined value or zero. In this case, the threshold of each comparator 71, 72 or 73 is set to zero independent of the output of the OFFSET signal. FIG. 4B indicates the operation when the set value of the rotation speed is zero. Although not shown in the Figure, the DECOFF signal outputs an instruction for reducing the absolute value of the threshold of each comparator 71, 72 or 73 based on number of times in which the signals WIN1 to 6 reach "H" level, and the like. Here, the absolute value of the threshold during the accelerating operation is not necessarily made equal to the absolute value during the initial position detecting operation, and the absolute value may be changed.

The relative position of the rotor to the stator is determined based on the respective output signals UN, VN and WN of the comparators 71, 72 and 73 and the signals WIN1 to 6 from the phase-switching controller 50.

Figure 5:
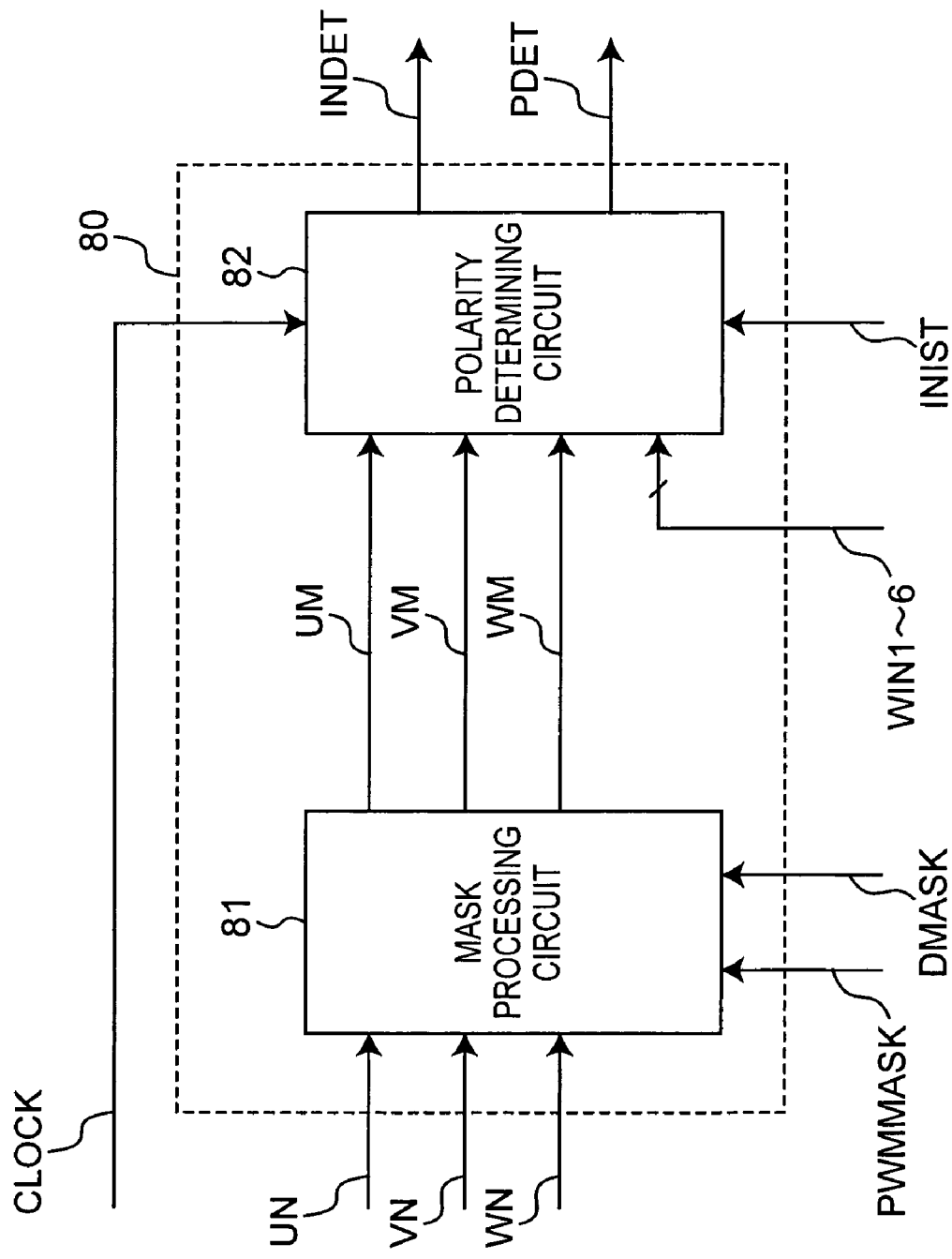
FIG. 5 is a drawing that shows a specific structure of a position determining unit.
Figure 6:
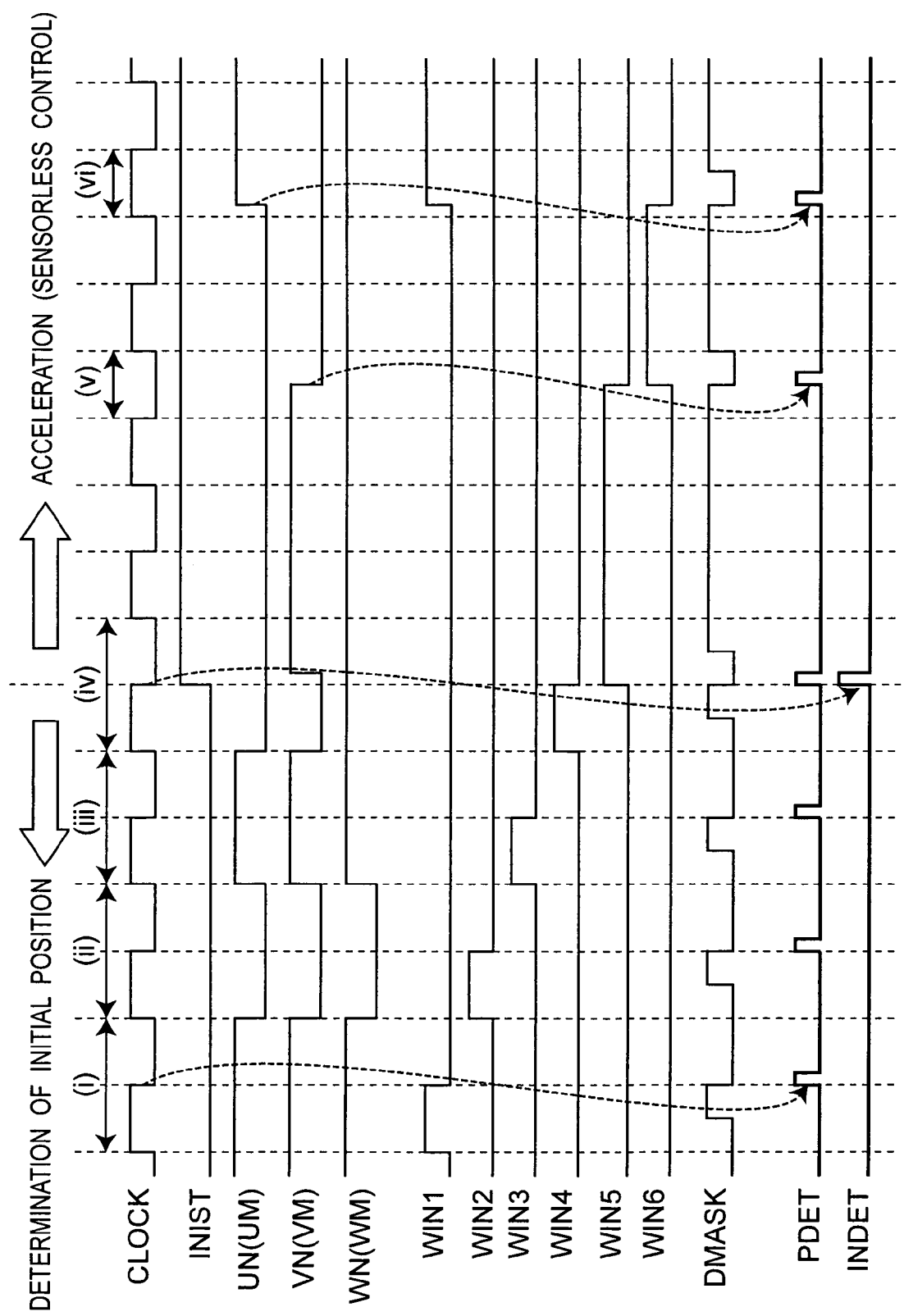
FIG. 6 is a signal waveform diagram that explains the operation of the position determining unit.

The following description will discuss the position determining unit 80. FIG. 5 is a drawing that shows a specific structure of the position determining unit 80. FIG. 6 is a drawing that explains the operation thereof. As shown in FIG. 5, the position determining unit 80 includes a mask processing circuit 81 and a polarity determining circuit 82.

The output signals UN, VN and WN from the comparators 71, 72 and 73 contain influences from high-frequency switching noise due to a PWM driving operation and ringing of a non-conduction phase due to a voltage change in a conduction phase (influences from noise and ringing are omitted in FIG. 6). The mask processing circuit 81 receives the PWMMASK signal from the switching controller 40 and the DMASK signal from the phase-switching controller 50, masks, based on these signals, the output signals UN, VN and WN from the comparators 71, 72 and 73, and outputs signals UM, VM and WM, obtained through the masking operation, to the polarity determining circuit 82. In this manner, the mask processing circuit 81 masks the influences of high-frequency switching noise due to a PWM driving operation by using the PWMMASK signal, and also masks the ringing period of a non-conduction phase by using the DMASK signal.

The polarity determining circuit 82 determines an initial position of the rotor based upon the outputs UN, VN and WN from the comparators 71 to 73. More specifically, the polarity determining circuit 82 receives the signals WIN1 to 6 from the phase-switching controller 50, the signals UM, VM and WM from the mask processing circuit 81, the INIST signal from the determination/start switching unit 90, and the external clock signal CLOCK, and generates a PDET signal to output this signal to the phase-switching controller 50, and also generates an initial-position determining signal INDET to output this signal to the determination/start switching unit 90. The polarity determining circuit 82 selects the signals UM, VM and WM, based on the signals WIN1 to 6 independent of "H" level or "L" level of the INIST signal. Determining levels are set for the selected signals. FIG. 7 shows one example of this setting.

In the example shown in FIG. 7, when the signal WIN1 is at "H" level, the WM signal is selected, and "L" level is specified as its determining level. When the signal WIN2 is at "H" level, the VM signal is selected, and "H" level is specified as its determining level. When the signal WIN3 is at "H" level, the UM signal is selected, and "L" level is specified as its determining level. When the signal WIN4 is at "H" level, the WM signal is selected, and "H" level is specified as its determining level. When the signal WIN5 is at "H" level, the VM signal is selected, and "L" level is specified as its determining level. When the signal WIN6 is at "H" level, the UM signal is selected, and "H" level is specified as its determining level.

During the accelerating operation (when the INIST signal is at "H" level), when levels of the signals UM, VM and WM are set to levels that are specified by the signals WIN1 to 6, the PDET signal outputs an "H" pulse signal. In FIG. 6, this corresponds to periods (iv), (v) and (vi). For example, during the period (v), the signal WIN5 is at "H" level, and then FIG. 7 shows that the selected signal is "VM" and the determining level thereof is "L". Therefore, in response to a change in the VM signal to "L" level, the PDET signal outputs "H" level.

In contrast, during the initial position determining operation (when the INIST signal is at "L" level), even when the levels of the signals UM, VM and WM are not set to levels that are specified by the signals WIN1 to 6, the PDET signal outputs an "H" pulse signal at falling timing of the clock signal CLOCK. In FIG. 6, this corresponds to periods (i), (ii) and (iii).

Moreover, during the initial position determining operation, the initial position determining signal INDET is set to "H" level in synchronized with falling timing of the clock signal CLOCK, only when the levels of the signals UM, VM and WM are set to those specified by the signals WIN1 to 6. At this time, the initial position of the rotor is detected. This corresponds to the period (iv) in FIG. 6 (in this period, since the signal WIN4 is at "H" level and the signal WM is at "H" level, conditions as shown in FIG. 7 are satisfied).

Upon receipt of the instruction signal RGO for instructing the driving stop/driving start and the initial-position determining signal INDET from the position determining unit 80, the determination/start switching unit 90 generates an INIST signal, and outputs this signal to the switching controller 40, the phase-switching controller 50, the position determining unit 80 and the threshold controller 100. The determination/start switching unit 90 switches between the initial-position determining operation for determining the relative initial position of the rotor to the stator and the accelerating start with a PWM driving operation. Upon detection of "H" level of the initial-position determining signal INDET of the position determining unit 80, the INIST signal changes from "L" level to "H" level. The flows of these signals will be described later in detail.

The following description will discuss a starting method of a motor by the motor driving apparatus in detail. In the case when a two-phase conduction is carried out, voltages (a potential difference between the terminal of the winding and the neutral point) generated in a non-conduction phase include a voltage which is generated when rotation of the rotor causes the magnetic flux of the rotor to cross the windings of the stator, and a voltage which is generated due to a temporal change in a current during a conduction phase. In the following explanation, the former voltage generated by the rotation is referred to as "back electromotive force", and the latter voltage generated by the change in current is referred to as "induced voltage".

Figure 8A:
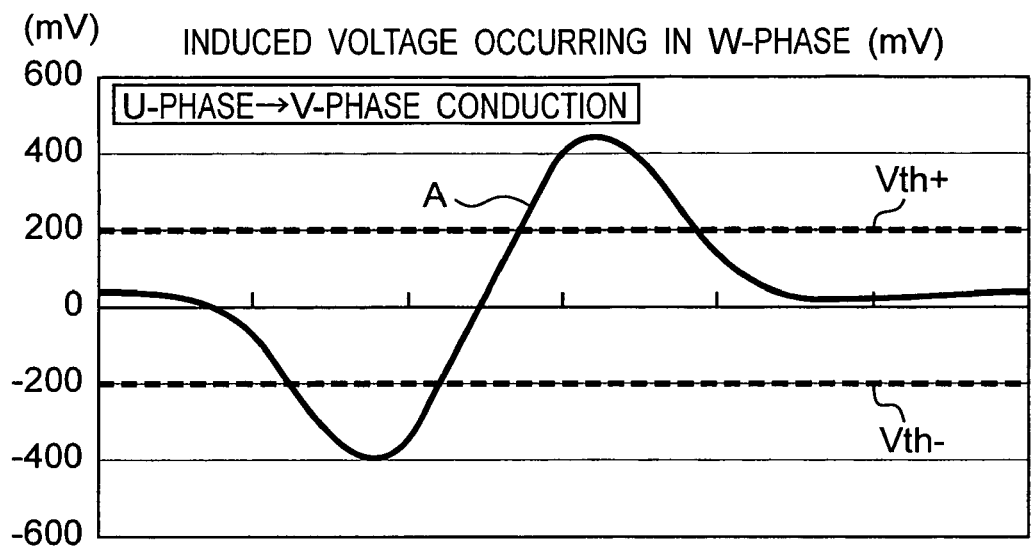
FIGS. 8A and 8B are drawings that show the results of measurements of the induced voltage carried out by the inventors of the present invention.

FIG. 8 shows measurement results of the induced voltage, carried out by the inventors of the present application. A solid line "A" in FIG. 8A is formed by plotting the induced voltage generated in the W-phase winding 13 with the relative position of the rotor to the stator, when applying a voltage higher than the V-phase winding 12 to the terminal of the U-phase winding 11 for an extremely short period of time as not to allow the rotor to react and move (hereinafter, this is expressed as "supplying a current pulse from the U-phase winding 11 to the V-phase winding 12").

Figure 8B:
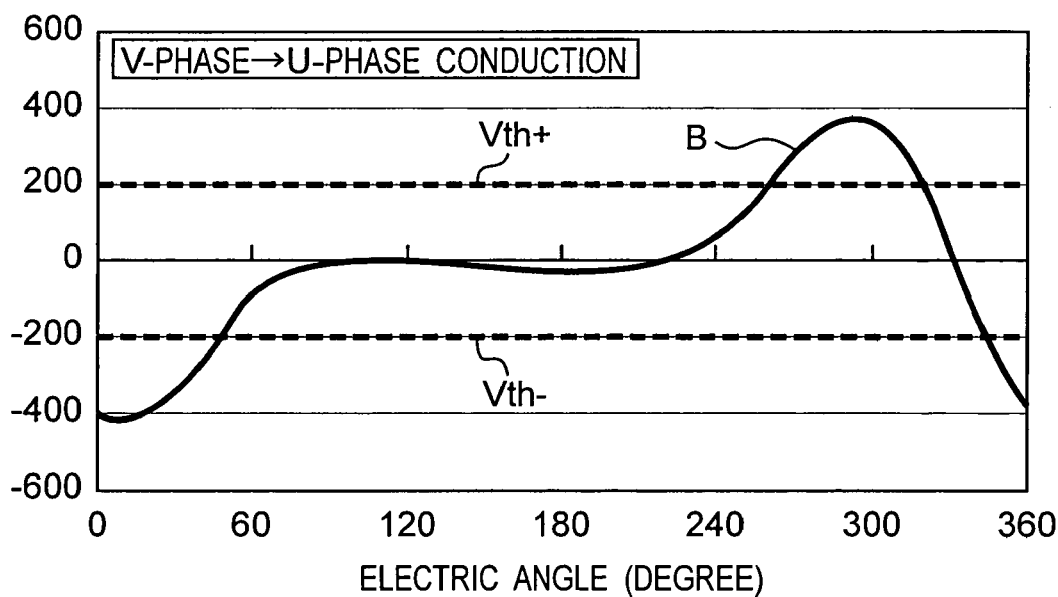

Moreover, a solid line "B" in FIG. 8B is formed by plotting the induced voltage generated in the W-phase winding 13 with the relative position of the rotor to the stator, when applying a voltage higher than the U-phase winding 11 to the terminal of the V-phase winding 12 for an extremely short period of time so as not to allow the rotor to react and move (hereinafter, expressed similarly as "supplying a current pulse from the V-phase winding 12 to the U-phase winding 11").

In FIG. 8, Vth+ and Vth− are predetermined voltages having positive and negative polarities respectively. The ordinate axis indicates the detected voltage (mV) and the abscissa axis indicates the relative position of the rotor to the stator by using the electrical angle (degrees). Here, with respect to a reference of the angle, the zero-cross point of the rising of the back electromotive force generated in the U-phase winding 11 upon rotation of the rotor is set to 0 degree. Here, in FIG. 8, the flow of a current pulse from the U-phase winding 11 to the V-phase winding is expressed as "U→V", and the flow of a current pulse from the V-phase winding 12 to the U-phase winding 11 is expressed as "V→U". Hereinafter, in the Figures, the flow of a current pulse from one phase winding to another phase winding is expressed as "→" including the direction of the current flow.

With respect to the solid line "A" of FIG. 8A, large peaks appear in the vicinity of 120 degrees as well as in the vicinity of 180 degrees. Moreover, with respect to the solid line "B" of FIG. 8B, large peaks appear in the vicinity of 300 degrees as well as in the vicinity of 360 degrees. Although not shown in the figures, the induced voltage of the U-phase winding 11 on supplying a current pulse from the V-phase winding 12 to the W-phase winding 13 and the induced voltage of the V-phase winding 12 on supplying a current pulse from the W-phase winding 13 to the U-phase winding 11 are indicated by shapes obtained by shifting the plots of FIG. 8A by ±120 degrees, respectively. Moreover, the induced voltage of the U-phase winding 11 on supplying a current pulse from the W-phase winding 13 to the V-phase winding 12 and the induced voltage of the V-phase winding 12 on supplying a current pulse from the U-phase winding 11 to the W-phase winding 13 are indicated by shapes obtained by shifting the plots of FIG. 8B by ±120 degrees, respectively.

Figure 9:
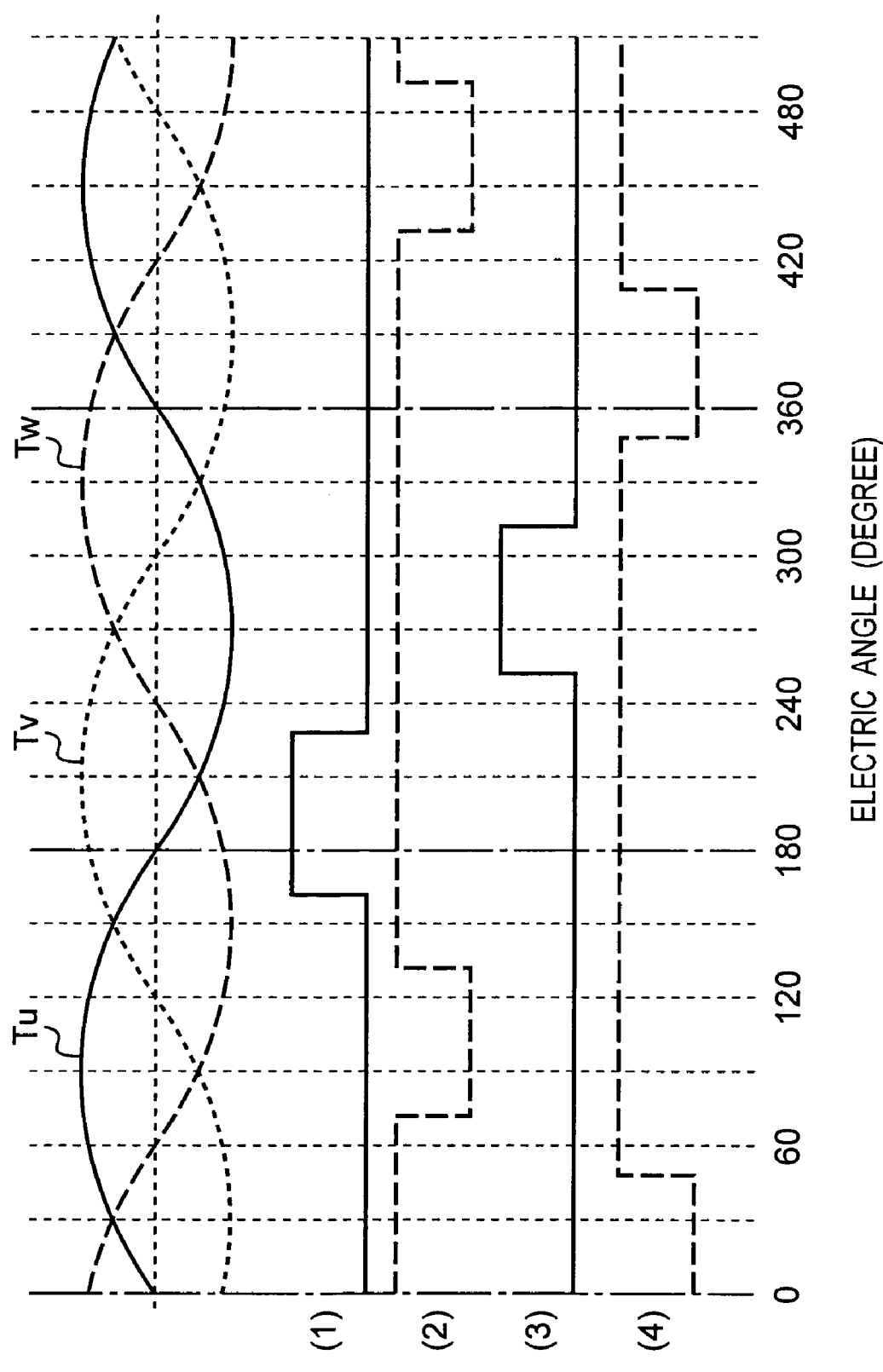
FIG. 9 is a drawing that shows a relationship between an output indicating comparison result of an induced voltage and a threshold (Vth+, Vth−) shown in FIG. 8, and a torque constant.

In FIG. 9, (1) and (2) respectively indicate outputs obtained when the induced voltage indicated by the solid line "A" of FIG. 8A are compared with predetermined values Vth+ and Vth− by the comparator 73. In FIG. 9, (3) and (4) respectively indicate outputs obtained when the induced voltage indicated by the solid line "B" of FIG. 8B are compared with predetermined values Vth+ and Vth− by the comparator 73. Here, Vth+ is a positive voltage, and Vth− is a negative voltage, and absolute values of those are equal to each other. Vth+ and Vth− are defined as thresholds of the comparator 73. When the induced voltage exceeds the thresholds, "H" level is output, and when the induced voltage is below the thresholds, "L" level is output.

Moreover, in FIG. 9, Tu, Tv and Tw indicate torque constants of the U-phase winding 11, V-phase winding 12 and W-phase winding 13, respectively. Here, upon supplying a current to the neutral point from the terminal of the winding when the torque constant is a positive value, a torque is generated in the forward rotating direction to accelerate the rotor. Upon supplying a current to the terminal of the winding from the neutral point when the torque constant is a negative value, a torque is generated in the forward rotating direction to accelerate the rotor.

For example, (1) of FIG. 9 represents an output of the comparator 73 obtained when a current pulse is supplied from the U-phase winding 11 to the V-phase winding 12 with the threshold set to Vth+ . It shows that Tv is positive and Tw is negative in a range in which "H" level is output. Thus it is found that by making a current flow from the V-phase winding 12 to the W-phase winding 13 for such a period that the rotor can react, a torque is generated in the forward rotating direction. In the same manner, (2) of FIG. 9 represents an output of the comparator 73 obtained when the threshold is set to Vth−. It shows that Tu is positive and Tw is negative in a range in which "L" level is output. Thus it is found that by making a current flow from the U-phase winding 11 to the W-phase winding 13 for such a period that the rotor can react, a torque is generated in the forward rotating direction. Similarly, by making a current flow from the W-phase winding 13 to the U-phase winding 11 in (3) of FIG. 9 in a range in which "H" level is output, and a current flow from W-phase winding 13 to the V-phase winding 12 in (4) of FIG. 9 in a range in which "L" level is output, for such a period that the rotor can react, a torque is generated in a forward rotating direction. Here, a conduction phase for generating a torque in the forward rotating direction while the rotor is stopped is referred to as "conduction phase for start up".

FIG. 10 shows the relationship among a direction of application of current pulse obtained from FIG. 9, polarity of the threshold of the comparator 73 and a conduction phase for start-up. In the Figure, the conduction phase in which a current flows is expressed by "=>". For example, the conduction phase in which a current flows from the U-phase winding to the V-phase winding is expressed as "U=>V". In the present embodiment, the conduction phase is switched in the order of U=>V, U=>W, V=>W, V=>U, W=>U, W=>V, U=>V so as to forwardly rotate the rotor.

(1) to (4) of FIG. 10 correspond to (1) to (4) of FIG. 9 respectively. With respect to (2) and (3) of FIG. 10, it is found that the relationship between the direction of the applied current pulse upon detection of the induced voltage and the conduction phase for start up is coincident with the order of switching conduction phase for forward rotation of the rotor.

FIG. 11 is a drawing that shows the relationship among direction of the applied current pulse upon determination of the initial position (combination of conduction phase and conduction direction), phase of a winding from which an induced voltage is detected, polarity of a threshold used for position determination, and conduction phase for start up after the completion of the initial position determination. As shown in this Figure, the direction in which the current pulse flows has six patterns. These six conduction patterns are switched one after another in the order of <1>→<2>→<3>→<4>→<5>→<6>→<1>→ . . . These conduction patterns and the switching order are coincident with conduction patterns that are applied during accelerating the motor after the initial position determination. In other words, these patterns are coincident with conduction patterns for forward rotation of the rotor. Hence, the conduction phase for start up after the initial position determination can be determined as a phase which is switched to advance in the order of forward rotation by one pattern from the conduction phase on the initial position determination. This allows the device structure to be simplified. The direction of supplying a current pulse corresponds to the combination of the winding phase used for detecting the induced voltage and the polarity of the threshold. Therefore specifying the direction of supplying a current pulse and the polarity of the threshold causes only one conduction phase for start up to be determined, plural conduction phases for start up are not be determined.

Figure 12:
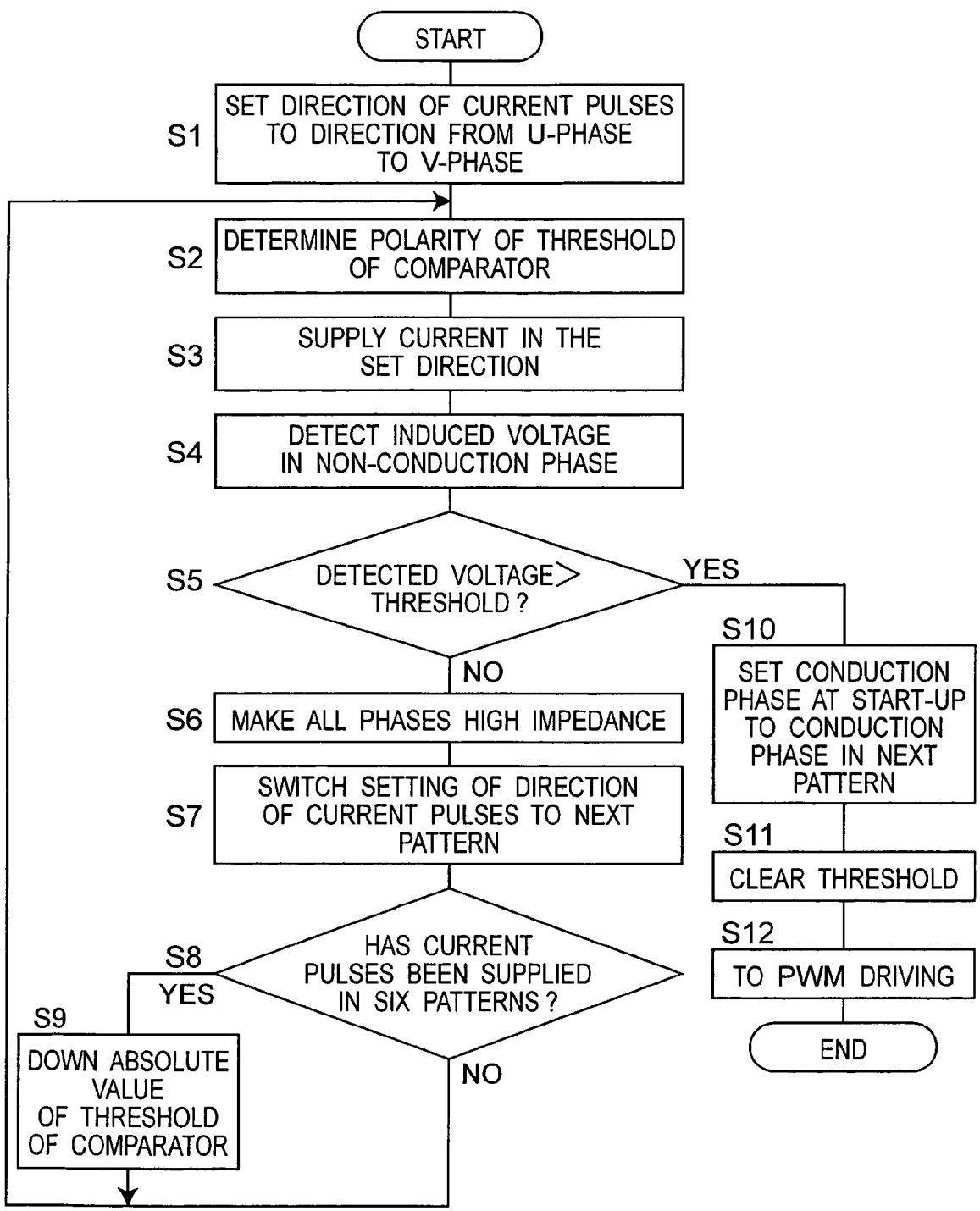
FIG. 12 is a flow chart that shows a determining operation of the relative initial position of a rotor to a stator.

FIG. 12 is a flow chart that shows a starting method of a motor driving apparatus in the case when the relationship between the direction of supplying a current and the conduction phase for start up satisfies a relationship indicated by FIG. 11.

Upon receipt of the instruction signal RGO for instructing the starting operation, the motor driving apparatus starts an operation for determining the relative initial position of the rotor to the stator. At this time, the INIST signal which indicates that the initial position determining operation is being executed is set to "L" level.

Next, the direction of supplying a current pulse is set to a direction from the U-phase winding 11 to the V-phase winding 12 (S1). The polarity of the threshold of the comparator is determined (S2). A current pulse is applied in the set direction for such a short time that the rotor does not react to move (S3). The induced voltage is detected based on the detection phase of the induced voltage and the polarity of the threshold which are determined by the direction of supplying a current pulse as shown in FIG. 11 (S4). It is determined whether the induced voltage is greater than the threshold (S5). If it is greater, the sequence proceeds to step S10, while, if it is smaller, the sequence proceeds to step S6. Here, the expression that the induced voltage is greater than the threshold means that the polarity of the threshold and the polarity of the induced voltage are equal to each other and that the induced voltage is greater than the threshold in its absolute value.

At step S6, all the terminals of the three-phase windings of the motor are set in high impedance. The setting of the direction of supplying a current pulse is switched to the next pattern by one step in the switching order in forward rotation shown in FIG. 11 (S7). It is determined whether six patterns of current pulses have been supplied. When six patterns of current pulses have been supplied, the absolute value of the threshold of the comparator is lowered (S9). This arrangement is made so as to widen the angle range in which the induced voltage exceeds the threshold to determine the relative initial position of the rotor to the stator more easily.

Thereafter, the sequence returns to step S2, thereby repeating the operations of steps S2 to S9 until the YES determination has been made at step S5.

Moreover, when the induced voltage is greater than the threshold at step S5, a conduction phase to be obtained by switching to the next pattern by one step in the forward rotation direction in the pattern as shown in FIG. 11 is determined as a conduction phase for start up (S10). For example, when the present setting in the direction of supplying a current is from the V-phase winding to the W-phase winding (pattern <3>), the conduction phase for start up is set to V=>U. During the conduction phase for start up is set, the INIST signal changes from "L" level to "H" level, thereby completing the initial position determining operation. Moreover, when the setting value of rotation speed is zero, the threshold of the comparator is cancelled to zero (S11), and the controlling operation is switched to a PWM driving process (S12). Then a current is supplied in such a level that the rotor operates sufficiently to accelerate the motor. Although not shown in the figure, when the setting value of the rotation speed is a predetermined value, the controlling operation is switched to the PWM driving process (S12), and after the motor is accelerated by supplying a current in such a level that the rotor sufficiently operates, the threshold of the comparator is then cancelled to zero (S11).

Here, in FIG. 12, the direction of supplying a current pulse at start up is set from the U-phase winding 11 to the V-phase winding 12 (pattern <1>). However, not limited to this direction, the starting operation may be carried out by using another pattern. Moreover, it is not necessary to carry out the PWM driving process at step S12, and a linear driving operation may be carried out. Here, at step S9, the operation to lower the absolute value of threshold of each comparator 71, 72 or 73 is carried out. However, any one of the windings may be energized to shift the relative initial position of the rotor to the stator so that the induced voltage can be easily detected. Alternatively, the width of the current pulse may be slightly widened so that the induced voltage can be easily detected, or the combination of these methods may be used.

Figure 13:
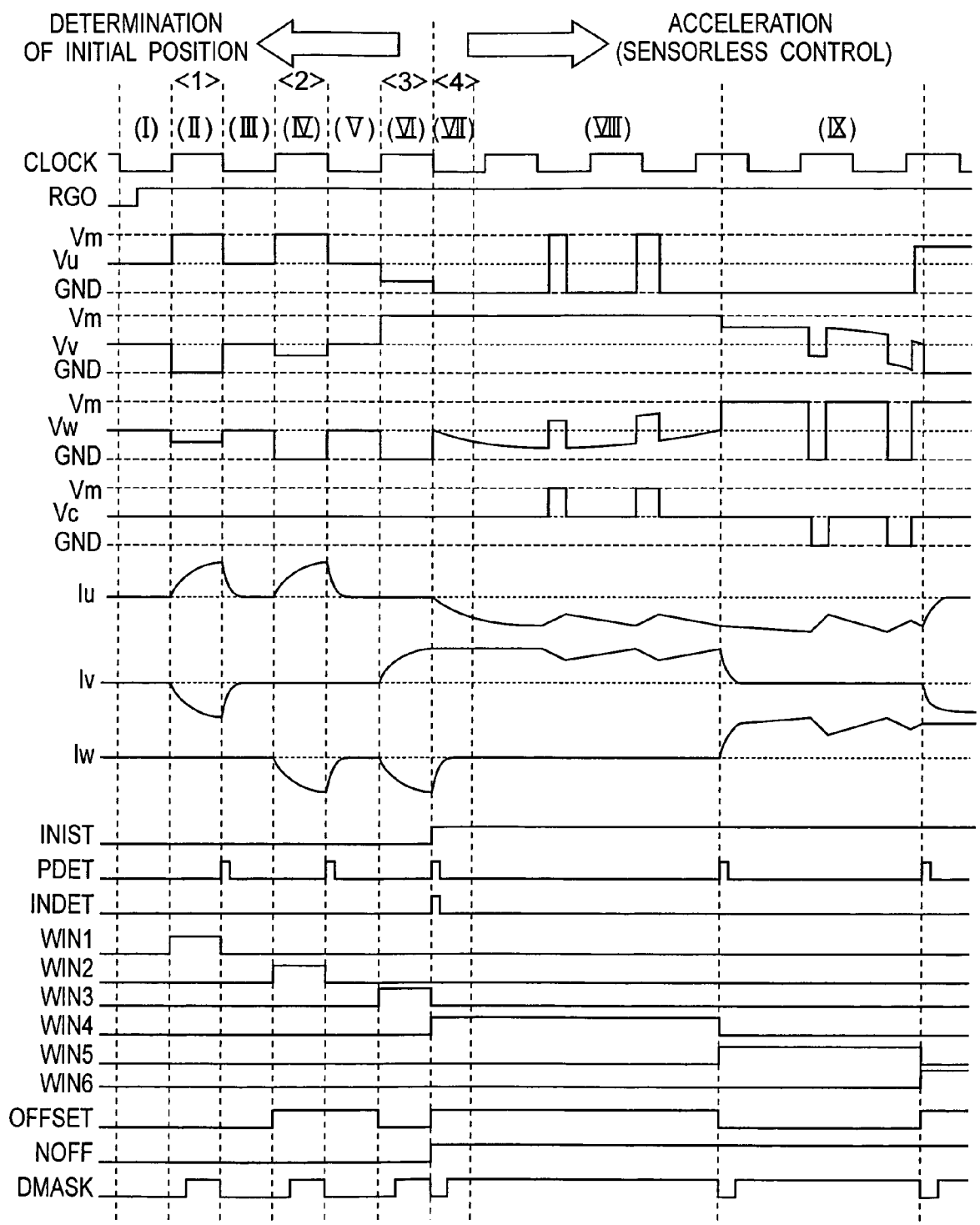
FIG. 13 is a signal waveform diagram that explains the operation of the sensor-less motor driving apparatus of FIG. 1.
Figure 14:
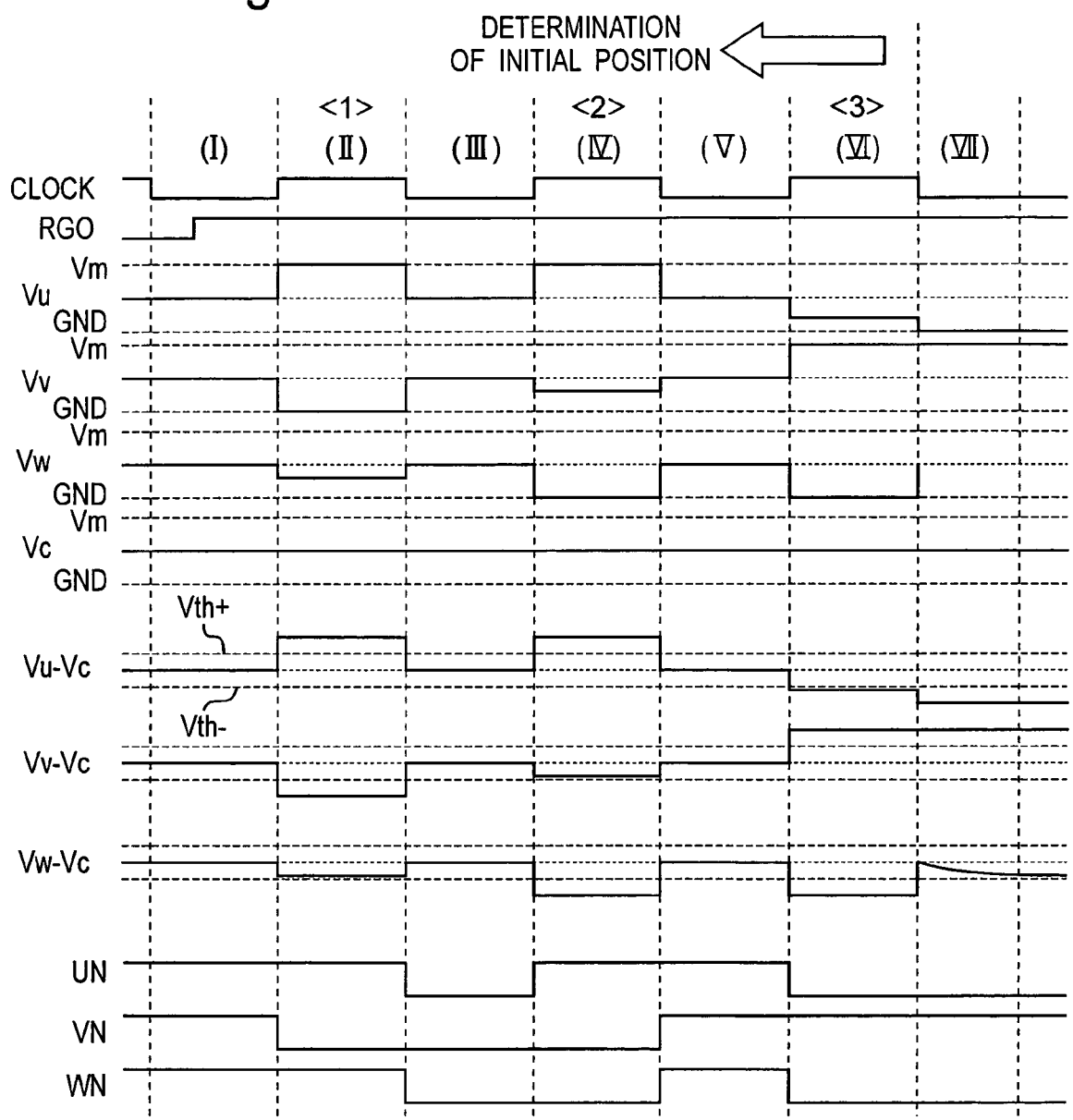
FIG. 14 is a drawing that shows one portion of a signal waveform shown in FIG. 13 in an enlarged manner.

Referring to FIGS. 13 and 14, the following description will discuss an operation that is carried out upon determination of the initial position and an operation for acceleration. In this case, the setting value of the rotation speed is defined as zero. In FIG. 13, CLOCK represents an external clock signal, and RGO represents an instruction signal. Vu, Vv and Vw represent terminal voltages of the U-phase winding 11, the V-phase winding 12 and the W-phase winding 13, respectively. Vc represents the neutral-point voltage of the motor 10 (influences from switching noise and ringing are omitted from FIG. 13). Moreover, Iu, Iv and Iw respectively represent electric currents flowing through the U-phase winding 11, the V-phase winding 12 and the W-phase winding 13, in which a direction from the terminal of the winding to the neutral point is "positive". INIST signal is an output of the determination/start switching unit 90, PDET signal and the initial-position determining signal INDET are outputs of the position determining unit 80. Signals WIN1 to 6 are outputs of the phase-switching controller 50. OFFSET signal and NOFF signal are outputs of the threshold controller 100, and DMASK signal is an output of the phase-switching controller 50.

FIG. 14 is a drawing that shows enlarged signal waveforms during periods from (I) to (VII) of FIG. 13. The clock signal CLOCK, the instruction signal RGO and the signals Vu, Vv, Vw and Vc are defined in the same manner as FIG. 13. Here, Vu–Vc, Vv–Vc and Vw–Vc respectively indicate a voltage obtained by subtracting the neutral point voltage from the terminal voltage of the U-phase winding 11, a voltage obtained by subtracting the neutral point voltage from the terminal voltage of the V-phase winding 12 and a voltage obtained by subtracting the neutral point voltage from the W-phase winding 13. When no current is flowing in the phase windings, Vu–Vc, Vv–Vc and Vw–Vc represent the induced voltage of the U-phase winding 11, the induced voltage of the V-phase winding 12 and the induced voltage of the W-phase winding 13, respectively. UN, VN and WN signals are outputs of the comparators 71, 72 and 73, respectively.

In the period (I), the instruction signal RGO for instructing a starting operation is changed to "H" level so that all the circuits start operations. The INIST signal outputs "L" level to carry out the initial position determining operation. At this time, the switching controller 40 is not operated. Moreover, the NOFF signal holds "L" level.

In the period (II), the signal WIN1 is changed to "H" level at the rising timing of the CLOCK signal to simultaneously allow a current pulse to flow from the U-phase winding 11 to the V-phase winding 12 (corresponding to <1> in FIG. 11). Moreover, the OFFSET signal outputs "L" level to set the polarity of the threshold of each comparator 71, 72 or 73 to negative. When the DMASK signal is changed to "H" level, the differential voltage between Vw and Vc, that is, the induced voltage generated in the W-phase winding 13, can be determined. With the signal WIN1 at "H" level, it is determined that the induced voltage has been detected, when the WN signal of the position determining unit 80 is outputting "L" level (see FIG. 7). Although the polarity of the induced voltage (value of Vw–Vc) of the W-phase winding 13 is negative, the voltage does not exceed the threshold. Therefore, the WN signal becomes "H" level, and it is determined that no induced voltage has been detected.

In the period (III), since it is determined that no induced voltage has been detected in the period (II), the PDET signal outputs "H" pulse at the falling timing of the CLOCK signal. Upon receipt of "H" pulse of the PDET signal, the signal WIN1 is changed to "L" level to make all the phases high impedance so that the current flowing from the U-phase winding 11 to the V-phase winding 12 is set to zero. Moreover, upon receipt of "H" pulse of the PDET signal, the DMASK signal is also changed to "L" level.

In the period (IV), the signal WIN2 is changed to "H" level at the rising timing of the CLOCK signal to simultaneously allow a current pulse to flow from the U-phase winding 11 to the W-phase winding 13 (corresponding to <2> in FIG. 11). Moreover, the OFFSET signal outputs "H" level to set the polarity of the threshold of each comparator 71, 72 or 73 to positive. Change in state of the DMASK signal to "H" level allows the induced voltage generated in the V-phase winding 13 to be determined. With the signal WIN2 at "H" level, it is determined that the induced voltage has been detected, when the VN signal of the position determining unit 80 is outputting "H" level (see FIG. 7). Since the polarity of the induced voltage (value of Vv–Vc) of the V-phase winding 12 is negative, the VN signal becomes "L" level, with the result that it is determined that no induced voltage has been detected.

In the period (V), since it is determined that no induced voltage has been detected in the period (IV), the PDET signal outputs "H" pulse at the falling timing of the CLOCK signal. Upon receipt of "H" pulse of the PDET signal, the signal WIN2 is changed to "L" level to make all the phases in high impedance so that the current flowing from the U-phase winding 11 to the W-phase winding 13 is set to zero. Moreover, upon receipt of "H" pulse of the PDET signal, the DMASK signal is also changed to "L" level.

In the period (VI), the signal WIN3 is changed to "H" level at the rising timing of the CLOCK signal to simultaneously allow a current pulse to flow from the V-phase winding 12 to the W-phase winding 13 (corresponding to <3> in FIG. 11). Moreover, the OFFSET signal outputs "L" level to set the polarity of the threshold of each comparator 71, 72 or 73 to negative. Change in DMASK signal to "H" level allows the induced voltage generated in the U-phase winding 11 to be determined. Since the signal WIN3 is at "H" level, it is determined that the induced voltage has been detected, when the UN signal of the position determining unit is outputting "L" level (see FIG. 7). Since the polarity of the induced voltage (value of Vu−Vc) of the U-phase winding 11 is negative and the induced voltage exceeds the threshold, the UN signal becomes "L" level. Thus it is determined that the induced voltage has been detected.

In the period (VII), since it is determined that the induced voltage has been detected in the period (VI), the PDET signal and the initial position determining signal INDET output "H" pulse at the falling timing of the CLOCK signal so that the initial-position determining operation is completed. From this time, a motor start up operation is started. Upon receipt of "H" pulse of the initial-position determining signal INDET, the INIST signal is changed from "L" level to "H" level, and therefore the operations of the switching controller 40, the phase-switching controller 50, the position determining unit 80 and the threshold controller 100 are switched. In other words, the thresholds of the comparators 71, 72 and 73 become zero, and the result that a normal sensor-less controlling operation in which a zero-cross point of a back electromotive force is detected by PMW driving is carried out. More specifically, the switching controller 40 starts an operation to switch the control to the PWM driving. In the phase-switching controller 50, the signals WIN1 to 6 are output not in synchronization with the CLOCK signal, and the output control of the DMASK signal is also switched. In the position determining unit 80, "H" pulse of the PDET signal is not synchronized with the CLOCK signal, and "H" pulse of the initial position determining signal INDET is not generated. In the threshold controller 100, the NOFF signal is changed from "L" level to "H" level, and the thresholds of comparators 71, 72 and 73 become zero. Moreover, upon receipt of "H" pulse of the PDET signal, the signal WIN3 is changed to "L" level, and the signal WIN4 is changed to "H" level.

In the period (VIII), since the signal WIN4 is at "H" level, a PWM-controlled current flows from the V-phase winding 12 to the U-phase winding 11 and the rotor rotates in the forward rotating direction. Since the thresholds of comparators 71, 72 and 73 become zero, the PDET signal is controlled to output "H" pulse in synchronization with the zero-cross of a back electromotive force.

Thereafter, the normal sensor-less operation is carried out, and the conduction phase and detected polarities of the back electromotive force are successively switched in accordance with the forward rotations of the rotor so that the motor is started up while accelerated.

In an example shown in FIG. 13, the induced voltage detecting operations for determination of the initial position are carried out three times. However, in the minimum case, the initial position can be detected by one attempt of the detecting operation. Moreover, when six patterns of current pulse are prepared for the position determination, the induced voltage can be detected by six attempts of detecting operations at the most to commence the start up operation. In the conventional method disclosed in JP2001-275387A, it is necessary to provide a period in which all the six current patterns are applied for the detecting operation. In other words, a period corresponding to one cycle is inevitably required for the detecting operation. In contrast, in the method of the present embodiment, the number of attempts of detecting operations is six in the maximum. Thus it becomes possible to shorten the time required for the detecting operations on average, and consequently to achieve an earlier starting operation.

As described above, in the present embodiment, an induced voltage which is generated in a non-conduction phase during supplying a current pulse set to a level so as not to allow the rotor to react to move to a winding in a predetermined phase of a stator, is compared with a threshold to be consequently detected. This detection method causes the time required for determining the relative initial position of the rotor to the stator to be shortened, and consequently achieves the start up operation with short time. Moreover, since the start up operation is carried out after the initial position is determined, thereby achieving a stable starting operation. Moreover, in the present embodiment, the direction of supplying the current pulse for determining the position is switched in the same order as that of a current pulse to be applied for forward-rotating the rotor, at this time, the polarity of the threshold of each comparator 71, 72 or 73 is selected depending on the direction of supplying the current pulse. With this arrangement, it becomes possible to determine the relative initial position of the rotor to the stator with a simple structure.

In the present embodiment, the explanation has been given by using comparators of which threshold can be controlled; however, another arrangement may be used in which a comparator having a threshold which is zero, a comparator having a positive threshold and a comparator having a negative threshold are used in parallel with one another and the outputs of the comparators may be selected by a selector. Moreover, the three comparators 71, 72 and 73 are used for each of the phases of the windings of the rotor; however, only one comparator may be used. In this case, the terminal voltages Vu, Vv and Vw of the respective phases are selected by a selector, and each of the selected voltages is compared with the neutral-point voltage Vc. Moreover, the present embodiment has exemplified a case in which after the starting operation, a two-phase conduction process is carried out. However, it is understood that the starting operation may be carried out by using a three-phase conduction with a slope. The present embodiment is not intended to limit the control after the starting operation. Moreover, it is understood that the width of the current pulse may be changed according to a motor constant.

In the present embodiment, the switching controller 40 is not operated during a operation of detecting the induced voltage, and an induced voltage which is generated when supplying a current pulse is detected. However, a PWM driving operation for controlling the peak current may be executed and an induced voltage may be detected during on-period of the PWM, thereby the relative initial position of the rotor to the stator can be determined with the same structure as the present embodiment. Moreover, a PWM driving operation may be executed for control of the peak current, and an induced voltage may be detected during off-period of the PWM, thereby the initial position of the rotor can be also determined.

Embodiment 2

Figure 18A:
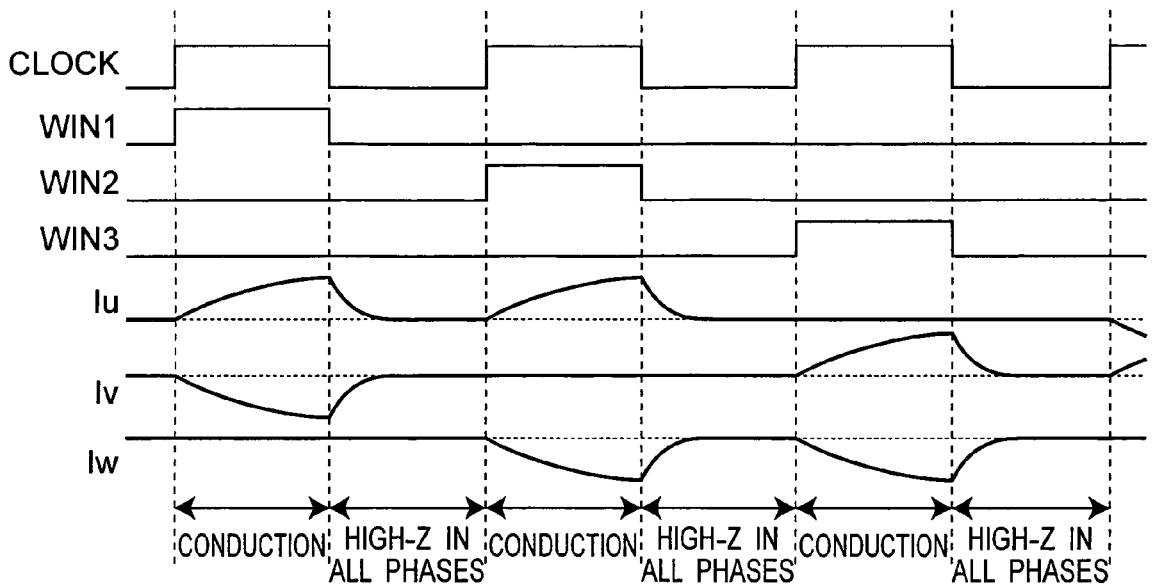
FIG. 18A is a drawing that explains a relationship between a conduction period and an all-phase high impedance period in a sensor-less motor driving apparatus of Embodiment 1.

In Embodiment 1, as shown in FIG. 18A, a period in which all the phases are set to high impedance during on-period of the signals WIN1 to 6 of the respective phases is provided. This arrangement is made so as to once set, to zero, a current in a stator winding generated on application of a current, consequently to achieve an accurate detection in the next detecting operation. However, as shown in FIG. 18A, the residual current in the winding becomes zero in a comparatively early stage during the high impedance period of the all phases. After the residual current becomes zero, it is not necessary to set all the phases to high impedance state, and as the high impedance period of all the phases becomes shorter, it becomes possible to shorten the processing time as a whole. Therefore, the present embodiment will discuss an arrangement for shortening the time required for determining the position by shortening the high impedance period of all phases in comparison with the arrangement of Embodiment 1.

Figure 15:
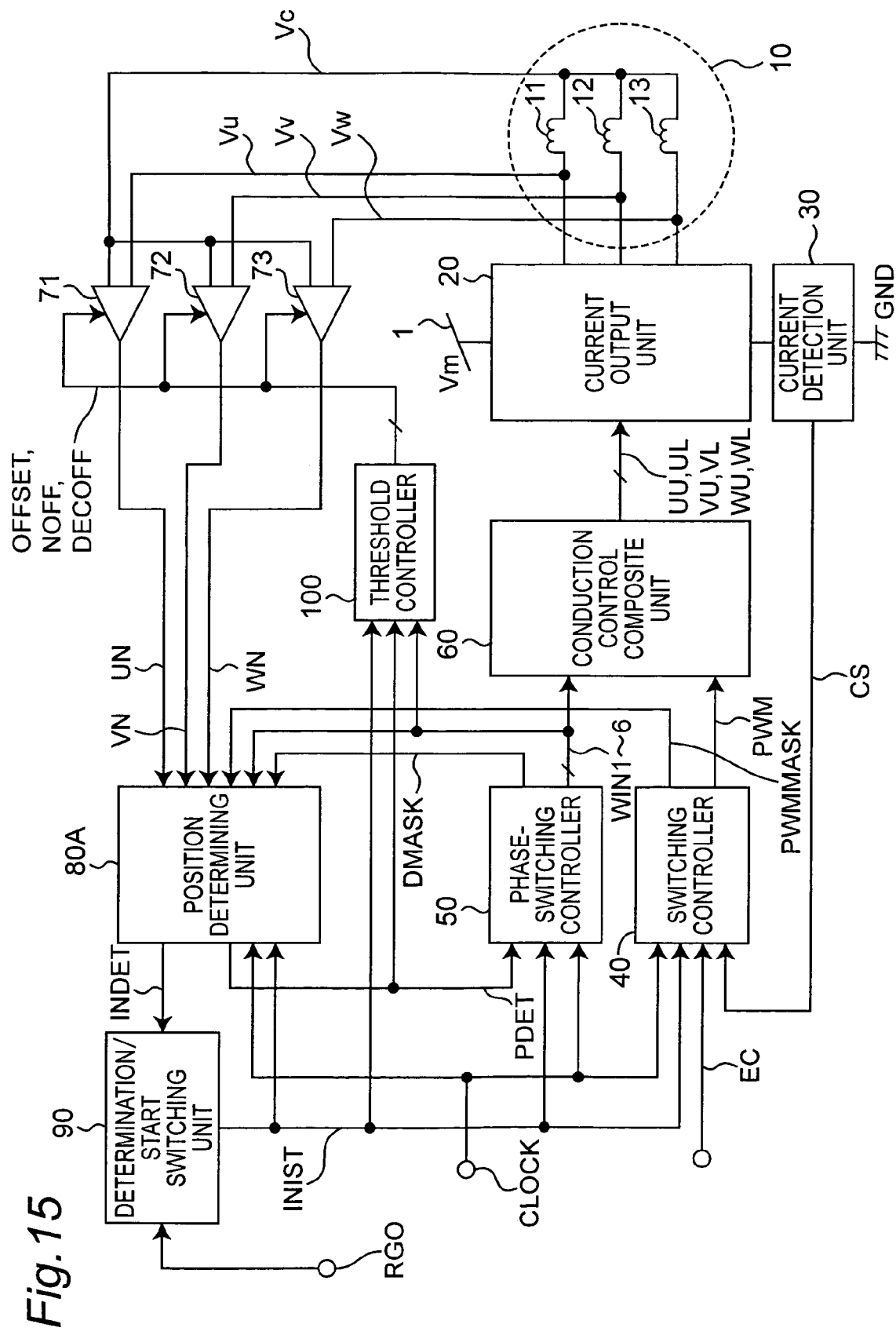
FIG. 15 is a drawing that shows a structure of a sensor-less motor driving apparatus in accordance with Embodiment 2 of the present invention.

FIG. 15 shows a structure of a sensor-less motor driving apparatus in accordance with Embodiment 2 of the present invention. This embodiment is different from Embodiment 1 in the inner structure of the position determining unit 80A. The other structures and operations are the same as those explained in Embodiment 1.

Figure 16:
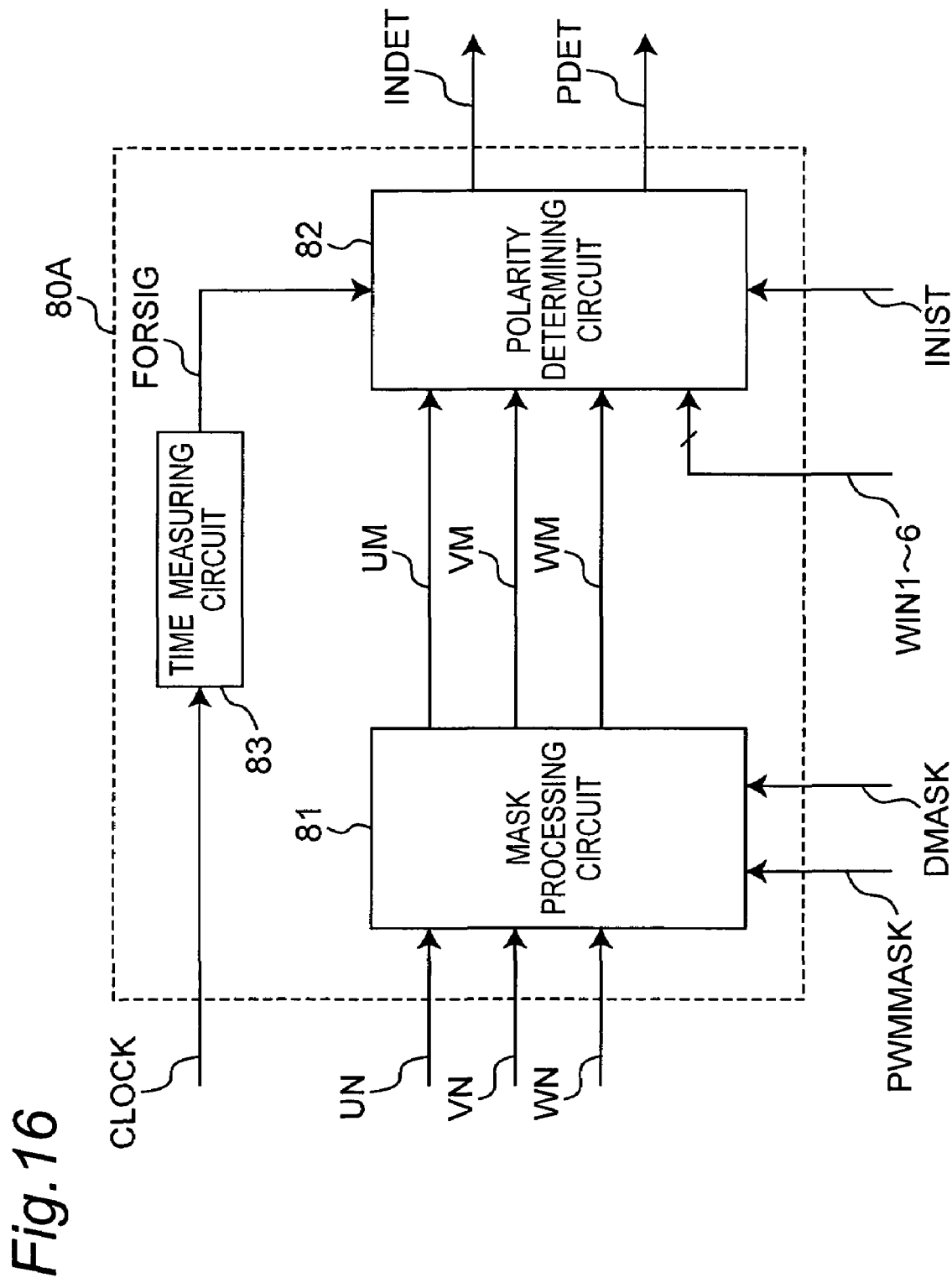
FIG. 16 is a drawing that shows a specific structure of a position determining unit in accordance with Embodiment 2.
Figure 17:
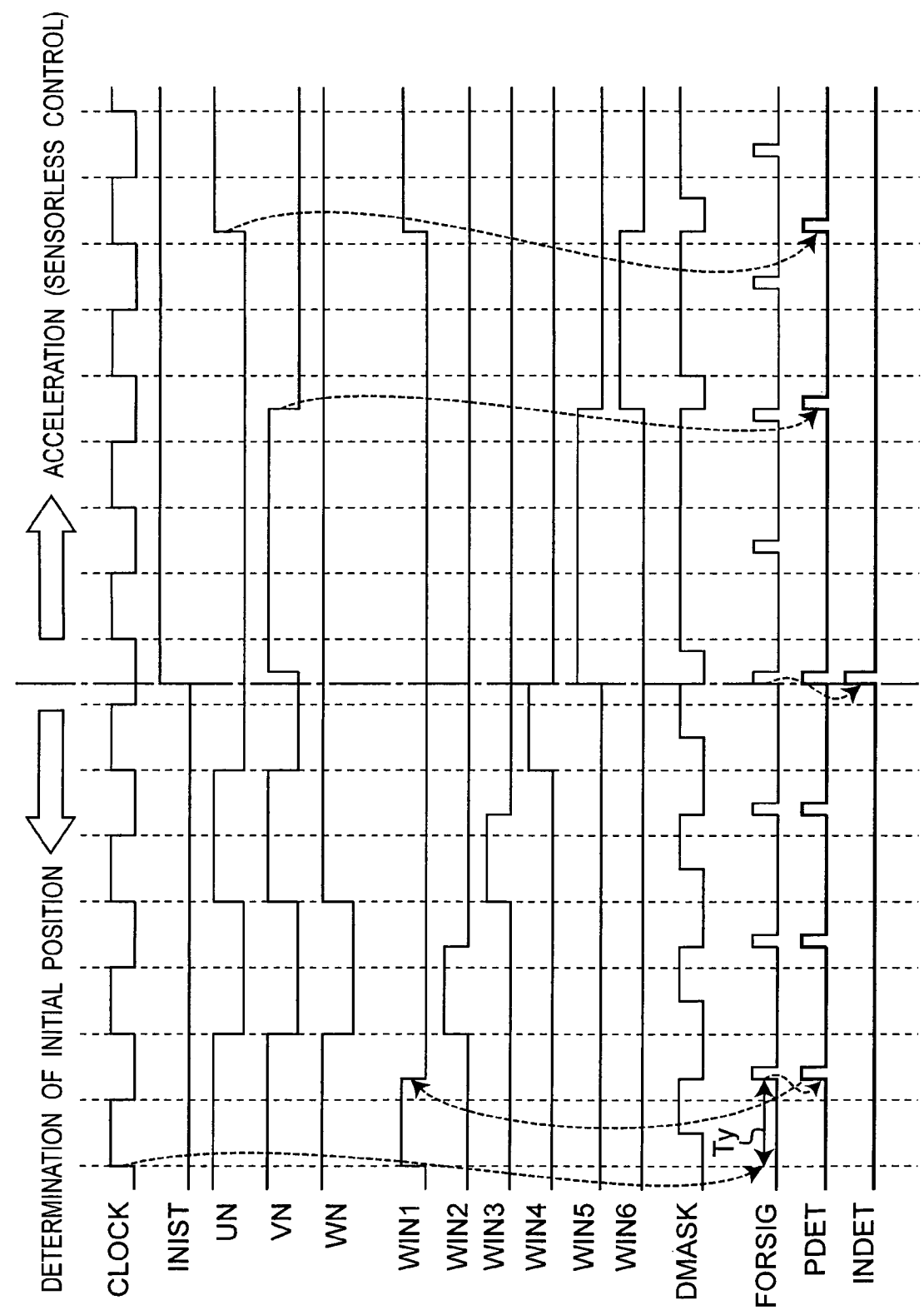
FIG. 17 is a signal waveform diagram that explains the operation of the position determining unit in accordance with Embodiment 2.

FIG. 16 shows a specific structure of the position determining unit 80A in the present embodiment. FIG. 17 is a timing chart that explains the operation of the position determining unit 80A.

The position determining unit 80A of the present embodiment has a structure which is further provided with a time measuring circuit 83 in addition to the position determining unit 80 of Embodiment 1. The position determining unit 80A inputs the clock signal CLOCK to a polarity determining circuit 82 through the time measuring circuit 83.

A mask processing circuit 81 receives the PWMMASK signal of the switching controller 40 and the DMASK signal of the phase-switching controller 50, masks influences from high-frequency switching noise due to PWM driving and a ringing period in a non-conduction phase due to a voltage change in a conduction phase that are contained in the UN, VN and WN signals of the comparators 71, 72 and 73, and outputs the resulting UM, VM and WM signals to the polarity determining circuit 82.

The polarity determining circuit 82 receives the signals WIN1 to 6 from the phase-switching controller 50, the UM, VM and WM signals from the mask processing circuit 81, the INIST signal from the determination/start switching unit 90 and a FORSIG signal from the time-measuring circuit 83, and outputs the PDET signal to the phase-switching controller 50, and the initial position determining signal INDET to the determination/start switching unit 90, respectively.

The time-measuring circuit 83 receives the CLOCK signal, and outputs the FORSIG signal to the polarity determining circuit 82. The FORSIG signal is a pulse signal that is output with a delay of predetermining time Ty from the rising timing of the CLOCK signal. The predetermined time Ty is set to a value greater than the pulse width of the CLOCK signal.

Independent of "H" level and "L" level of the INIST signal, when the levels of the UM, VM and WM signals correspond to levels that are specified by the signals WIN1 to 6, "H" pulse signal is output to the PDET signal. In particular, when the INIST signal is at "L" level, even if the levels of the UM, VM and WM signals don't correspond to levels that are specified by the signals WIN1 to 6, "H" pulse signal is output to the PEDT signal at the rising timing of the FORSIG signal. Only when the INIST signal is at "L" level and the levels of the UM, VM and WM signals correspond to levels that are specified by the signals WIN1 to 6, "H" pulse signal is output to the initial position determining signal INDET at the rising timing of the FORSIG signal.

As described above, in the present embodiment, during a period (interval during which the INIST signal is changed from "L" level to "H" level) in which the rotor initial position is being determined, the pulse width of each of the signals WIN1 to 6 is made longer than the CLOCK signal so that the period for supplying a current pulse is longer than one cycle of the CLOCK signal. Thus, it becomes possible to shorten the period of time during which all the phases are maintained in high impedance. Here, when the period during which all the phases are maintained in a high impedance is shortened, a current may still remain in the winding from which the induced voltage is detected, and thus kick back noise may occur to cause an erroneous detection in the induced voltage. However, the kick back noise can be masked by the DMASK signal.

Figure 18B:
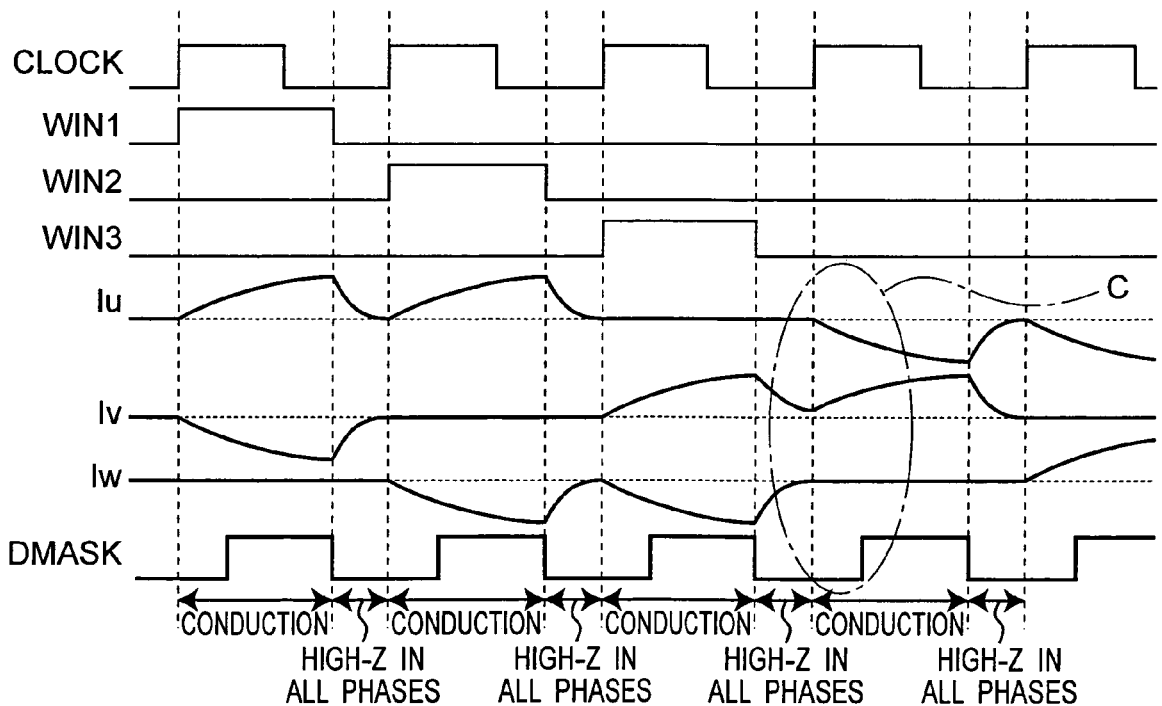
FIG. 18B is a drawing that explains a relationship between a conduction period and an all-phase high impedance period in a sensor-less motor driving apparatus of Embodiment 2.
Figure 19:
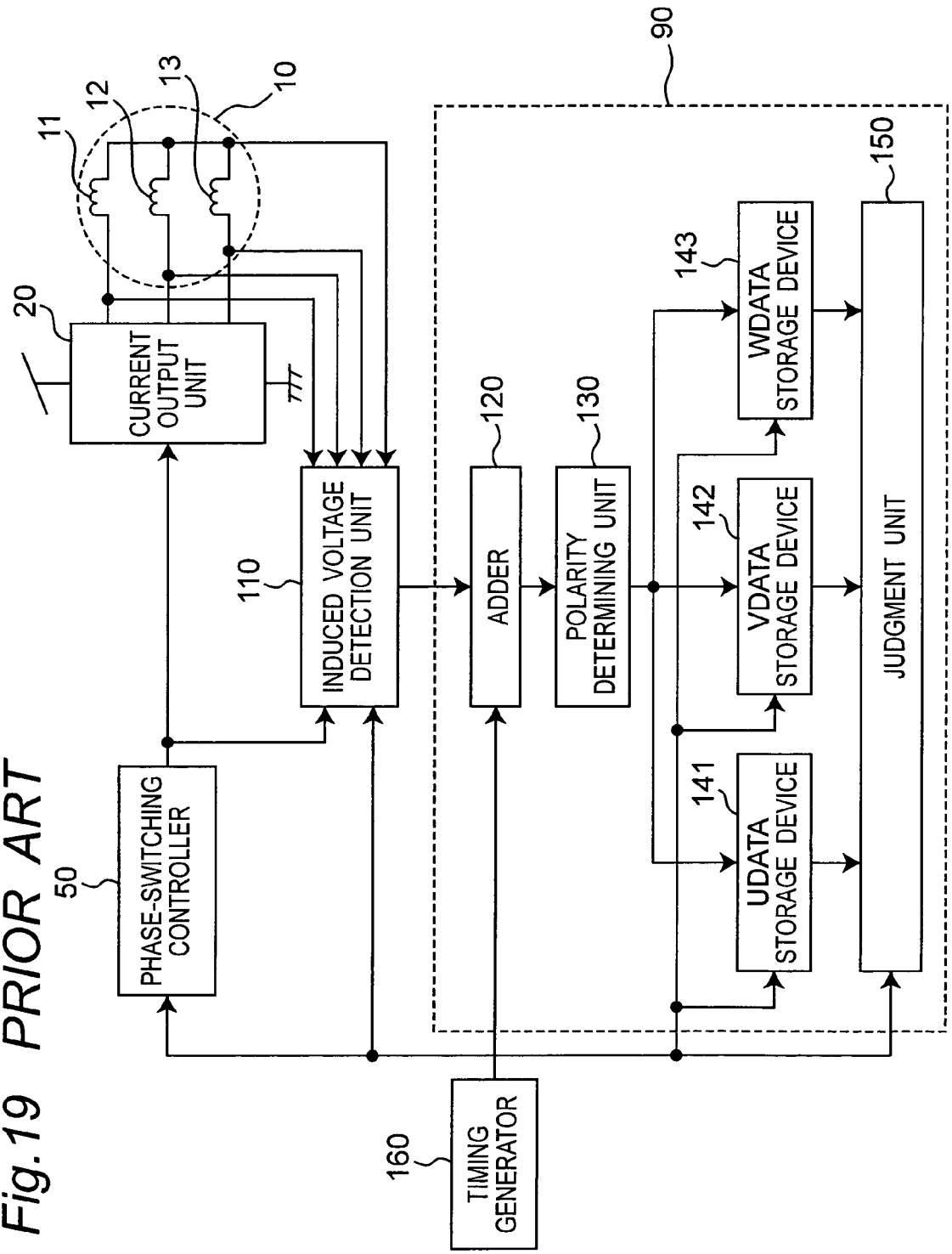
FIG. 19 is a drawing that shows a structure of a conventional motor driving apparatus.
Figure 20A:
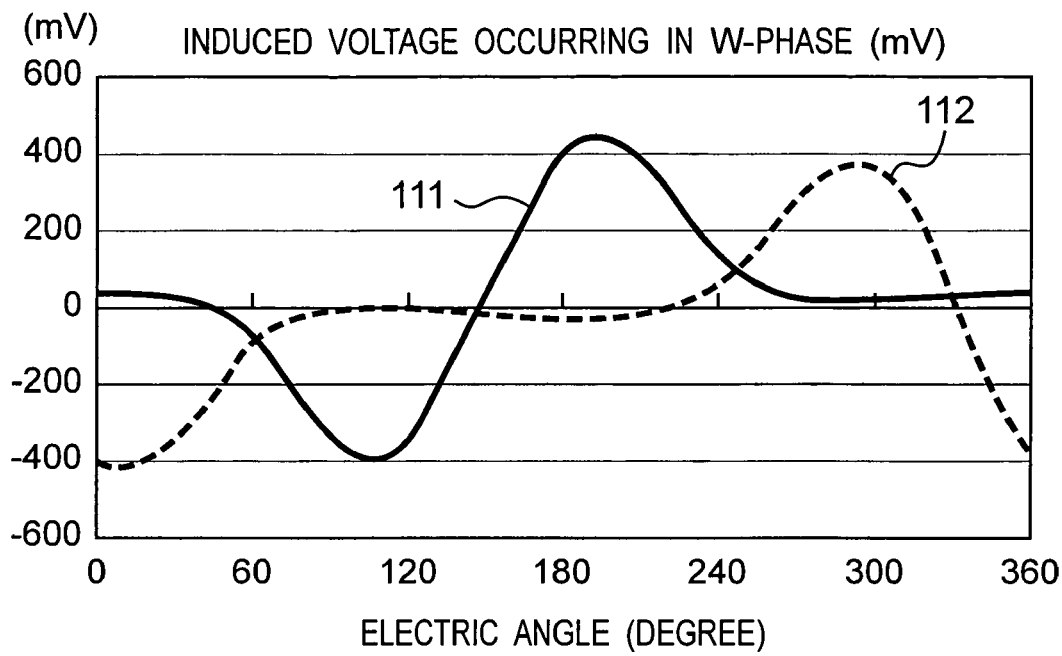
FIG. 20A is a drawing that shows waveforms of induced voltages.
Figure 20B:
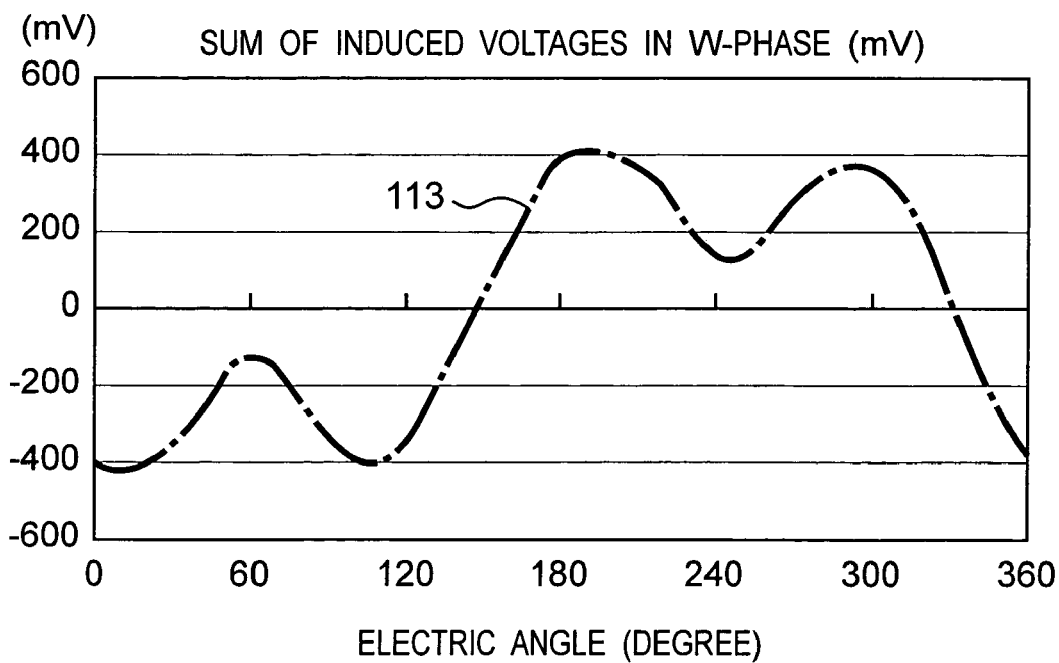
FIG. 20B shows sum of induced voltages which are derived from windings in the conventional motor driving apparatus.

FIGS. 18A and 18B show operations that are carried out during an operation of determining the initial position before the start up operation. FIG. 18A shows the driving apparatus of Embodiment 1, and FIG. 18B shows the driving apparatus of Embodiment 2. In both figures, the CLOCK signal is an external input signal with a constant cycle, and the signals WIN1 to 3 are outputs from the phase-switching controller 50. Here, Iu, Iv and Iw are currents flowing through the U-phase winding 11, the V-phase winding 12 and the W-phase winding 13, respectively, and the flowing direction from the terminal of the winding to the neutral point is defined to be positive. In this case, for comparison of the drawings, the periods during which a current pulse flows are made equal to one another.

As shown in FIG. 18B, in accordance with the present embodiment, it becomes possible to shorten the period during which all phases are maintained in high impedance as compared to the case of Embodiment 1 shown in FIG. 18A, and consequently to shorten the cycle of the CLOCK signal. Therefore, the determination of the relative initial position of the rotor to the stator can be made earlier than Embodiment 1. Here, within the range C, a current starts flowing from the V-phase winding 12 to the U-phase winding 11 before the current flowing from the V-phase winding 12 to the W-phase winding 13 falls to zero. However, since the masking is provided by the DMASK signal, no erroneous detection occurs in the induced voltage.

As described above, in the present embodiment, the period of time during which all the phases are maintained in high impedance is controlled during determining operation of the initial position. This makes it possible to shorten the time required for determining the relative initial position of the rotor to the stator.

The motor driving apparatus and method thereof in accordance with the present invention make it possible to achieve a stable sensor-less start up operation and also to shorten the starting time of a sensor-less motor by shortening the time required for determining the initial position. Therefore, the present invention is effectively applied to a motor driving apparatus or the like in which a PWM sensor-less driving operation is carried out.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2004-291181, filed on Oct. 4, 2004, which is expressly incorporated herein by reference in its entirety.

What is claimed is:

1. A motor driving apparatus which drives a motor having windings of a plurality of phases and a rotor in a sensor-less control, comprising:
 a comparator operable to compare an induced voltage generated in a motor winding of a non-conduction phase with a predetermined threshold;
 a threshold controller operable to control the threshold;
 a position determining unit operable to determine a rotor position based on an output from the comparator;
 a phase-switching controller operable to switch a conduction phase in response to the rotor position; and
 a current output unit operable to generate a current used for driving the motor and to supply the current to the conduction phase,
 wherein: the phase-switching controller supplies a predetermined phase of winding with a current pulse having a predetermined pulse width so as not to cause the rotor to react and operate in order to determine the initial position of the rotor, while the rotor is stopped;
 the position determining unit determines an initial position of the rotor based on the result of comparison between the induced voltage generated in a non-conduction phase by supplying the current pulse and the threshold; and
 the phase-switching controller performs energization according to the determined initial position of the rotor to start up the motor.

2. The motor driving apparatus according to claim 1, wherein the threshold controller changes polarity of the threshold of the comparator in accordance with a conduction phase and a conduction direction of the current pulse.

3. The motor driving apparatus according to claim 1, wherein the phase-switching controller switches the conduction phase and the conduction direction of the current pulse in accordance with an order of a conduction phase and a conduction direction that are set so as to forwardly rotate the rotor.

4. The motor driving apparatus according to claim 1, wherein the position-determining unit detects the induced voltage during only a period in which a motor current decreases or only a period in which a motor current increases, in order to determine the initial position of the rotor.

5. The motor driving apparatus according to claim 1, wherein, when the initial position of the rotor is determined completely, the phase-switching controller sets, as an appropriate conduction phase to be used for driving the rotor, the next conduction phase to the conduction phase to which the initial position of the rotor is determined, in the order of the conduction phases to be set for rotating the rotor forwardly.

6. The motor driving apparatus according to claim 1, wherein, after completion of the determination of the initial position of the rotor, the threshold controller sets the threshold to zero.

7. The motor driving apparatus according to claim 1, wherein, the threshold controller sets the threshold to zero when detecting that the motor has started and reached a predetermined rotation speed.

8. The motor driving apparatus according to claim 1, wherein a plurality of conduction patterns which are combinations of conduction phases and conduction directions of the current pulse are provided, and the conduction patterns are switched in a predetermined order so as to rotate the motor forwardly, and the threshold controller reduces the absolute value of the threshold of the comparator when the initial position of the rotor is not determined in spite of performing energization with the plurality of conduction patterns.

9. The motor driving apparatus according to claim 1, wherein, when the conduction phase of the current pulse is switched, a period for making the motor current zero is provided after a conduction period of the current pulse, and the period for making the motor current zero is made shorter than the conduction period.

10. A motor driving method which drives a motor having windings of a plurality of phases and a rotor in a sensor-less control, comprising:
 supplying a predetermined phase of winding with a current pulse having a predetermined pulse width so as not to cause the rotor to react and operate in order to determine the initial position of the rotor, while the rotor is stopped;
 attempting to determine an initial position of the rotor by comparing (a) an induced voltage generated in a non-conduction phase by supplying the current pulse with (b) a predetermined threshold;
 when the initial position of the rotor is not determined, lowering the threshold and again attempting to determine the initial position of the rotor with the lowered threshold; and
 performing energization according to the determined initial position of the rotor to start up the motor.

11. The motor driving method according to claim 10, wherein polarity of the threshold is changed in accordance with a conduction phase and a conduction direction of the current pulse.

12. The motor driving method according to claim 10, wherein the conduction phase and the conduction direction of the current pulse are changed in accordance with an order of a conduction phase and a conduction direction that are set so as to forwardly rotate the rotor.

13. The motor driving method according to claim 10, wherein the induced voltage is detected during only a period in which a motor current decreases or only a period in which a motor current increases, in order to determine the initial position of the rotor.

14. The motor driving method according to claim 10, wherein, when the initial position of the rotor is determined completely, the next conduction phase to the conduction phase to which the initial position of the rotor is determined in the order of the conduction phases to be set for rotating the rotor forwardly is set as an appropriate conduction phase to be used for driving the rotor.

15. The motor driving method according to claim 10, wherein, after completion of the determination of the initial position of the rotor, the threshold is set to zero.

16. The motor driving method according to claim 10, wherein the threshold is set to zero when detecting that the motor has started and reached a predetermined rotation speed.

17. The motor driving method according to claim 10, wherein a plurality of conduction patterns which are combinations of conduction phases and conduction directions of the current pulse are provided, and the conduction patterns are switched in a predetermined order so as to rotate the motor forwardly, and the absolute value of the threshold of the comparator is lowered when the initial position of the rotor is not determined in spite of performing energization with the plurality of conduction patterns.

18. The motor driving method according to claim 10, wherein, when the conduction phase of the current pulse is switched, a period for making the motor current zero is provided after a conduction period of the current pulse, and the period for making the motor current zero is made shorter than the conduction period.

* * * * *